US012298765B2

(12) United States Patent
Ren et al.

(10) Patent No.: US 12,298,765 B2
(45) Date of Patent: *May 13, 2025

(54) METHOD AND SYSTEM FOR LOCALIZATION OF AN AUTONOMOUS VEHICLE IN REAL-TIME

(71) Applicant: Huawei Technologies Co., Ltd., Shenzhen (CN)

(72) Inventors: Yuan Ren, Thornhill (CA); Bingbing Liu, Markham (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 403 days.

This patent is subject to a terminal disclaimer.

(21) Appl. No.: 17/584,058

(22) Filed: Jan. 25, 2022

(65) Prior Publication Data

US 2022/0144305 A1  May 12, 2022

Related U.S. Application Data

(63) Continuation of application No. 16/655,132, filed on Oct. 16, 2019, now Pat. No. 11,262,759.

(51) Int. Cl.
*G05D 1/00* (2024.01)
*B60W 40/114* (2012.01)
(Continued)

(52) U.S. Cl.
CPC ......... *G05D 1/0088* (2013.01); *B60W 40/114* (2013.01); *B60W 60/001* (2020.02);
(Continued)

(58) Field of Classification Search
CPC .... G05D 1/0088; G05D 1/0231; G05D 1/027; G05D 1/024; G05D 1/0272;
(Continued)

(56) References Cited

U.S. PATENT DOCUMENTS 4,933,864 A * 6/1990 Evans, Jr. ............ G05D 1/0253
318/587
5,638,116 A * 6/1997 Shimoura .............. G06V 10/48
348/169
(Continued)

FOREIGN PATENT DOCUMENTS

CN      107194957 A     9/2017
CN      109991984 A     7/2019
(Continued)

OTHER PUBLICATIONS

F.Moosmann, C. Stiller, Velodyne SLAM, Proceeding of 2011 IEEE Intelligent Vehicles Symposium (IV), pp. 393-398 2011.
(Continued)

*Primary Examiner* — Sihar A Karwan

(57) ABSTRACT

A method and system for localization of an autonomous vehicle in real-time disclosed. A particle filter process is used to generate an estimate of a pose of the autonomous vehicle based on a three-dimensional point cloud, a two-dimensional (2D) feature map and odometry data. A location of the autonomous vehicle in the environment is generated comprising a final pose of the vehicle determined based on the estimate of the pose of the autonomous vehicle and the odometry data, an elevation of the autonomous vehicle generated based on the final pose of the autonomous vehicle and the 2D feature map, and an orientation of the autonomous vehicle generated based on the odometry data.

19 Claims, 11 Drawing Sheets

(51) Int. Cl.
*B60W 60/00* (2020.01)
*G01S 7/48* (2006.01)
*G01S 17/89* (2020.01)
*G06V 20/58* (2022.01)
*G07C 5/08* (2006.01)

(52) U.S. Cl.
CPC ............ *G01S 7/4808* (2013.01); *G01S 17/89* (2013.01); *G05D 1/0231* (2013.01); *G05D 1/027* (2013.01); *G06V 20/58* (2022.01); *B60W 2420/408* (2024.01); *B60W 2520/14* (2013.01); *B60W 2520/16* (2013.01); *B60W 2520/18* (2013.01); *B60W 2530/18* (2013.01); *B60W 2554/4041* (2020.02); *B60W 2554/4049* (2020.02); *G07C 5/0841* (2013.01)

(58) Field of Classification Search
CPC .............. G05D 1/0274; B60W 40/114; B60W 60/001; B60W 2420/408; B60W 2520/14; B60W 2520/16; B60W 2520/18; B60W 2530/18; B60W 2554/4041; B60W 2554/4049; G01S 7/4808; G01S 17/89; G01S 17/86; G01S 17/931; G01S 17/894; G06V 20/58; G07C 5/0841; G06T 2207/10016; G06T 2207/10028; G06T 2207/30252; G06T 7/246; G06T 7/277; G06T 7/73

See application file for complete search history.

(56) References Cited

U.S. PATENT DOCUMENTS

| | | | | |
|---|---|---|---|---|
| 9,330,435 | B2* | 5/2016 | Goodman | G06T 3/067 |
| 9,971,352 | B1* | 5/2018 | Mudalige | G05D 1/0253 |
| 11,144,057 | B1* | 10/2021 | Ebrahimi Afrouzi | G05D 1/0217 |
| 2012/0030255 | A1 | 2/2012 | Xue et al. | |
| 2014/0198227 | A1* | 7/2014 | Mohammad Mirzaei | G06V 10/242 348/208.2 |
| 2015/0269705 | A1* | 9/2015 | Goodman | G06V 20/13 382/154 |
| 2015/0288947 | A1* | 10/2015 | Ahrns | G06F 18/24133 348/46 |
| 2016/0063706 | A1* | 3/2016 | Gonzalez-Banos | G06T 7/73 348/222.1 |
| 2017/0307746 | A1* | 10/2017 | Rohani | G01S 13/865 |
| 2018/0188043 | A1* | 7/2018 | Chen | G06T 7/11 |
| 2018/0356831 | A1* | 12/2018 | Luo | G01S 7/4808 |
| 2019/0033459 | A1* | 1/2019 | Tisdale | G01S 7/497 |
| 2019/0051056 | A1* | 2/2019 | Chiu | G06F 16/903 |
| 2020/0217667 | A1* | 7/2020 | Kim | G06T 7/73 |

FOREIGN PATENT DOCUMENTS

| | | |
|---|---|---|
| CN | 110286387 A | 9/2019 |
| EP | 3299763 A1 | 3/2018 |
| JP | 2009544966 A | 12/2009 |
| JP | 2014123200 A | 7/2014 |
| JP | 2016149090 A | 8/2016 |
| WO | 2012176249 A1 | 12/2012 |
| WO | 2018140748 A1 | 8/2018 |

OTHER PUBLICATIONS

Y. Zhang, J. Wang, X. Wang et al., A real-time curb detection and tracking method for UGVs by using a 3D-LIDAR sensor. In Proceedings of IEEE Conference on Control Applications 2015, pp. 1020-1025 2015.

Z. Tao, Ph. Bonnifait, V. Frémont et al., Lane marking aided vehicle localization. In Proceedings of 16th International IEEE Conference on Intelligent Transportation Systems 2013, pp. 1509-1515 2013.

J.H. Im, S.H. Im, G.I. Jee, Vertical Corner Feature Based Precise Vehicle Localization Using 3D LIDAR in Urban Area, Sensors, 16(8), 2016, pp. 1268 2016.

G. Zhou, B. Bescos, M. Dymczyk et al., Dynamic Objects Segmentation for Visual Localization in Urban Environments, arXiv:1807. 02996 2018.

M. Euston, P.W. Coote, T, Hamel, A complementary filter for attitude estimation of a fixed-wing UAV. IEEE/RSJ International Conference on Intelligent Robots and Systems 2008, pp. 340-345 2008.

J. Saarinen, H. Andreasson, T. Stoyanov and A. J. Lilienthal, Normal distributions transform Monte-Carlo localization (NDT-MCL), 2013 IEEE/RSJ International Conference on Intelligent Robots and Systems, Tokyo, 2013, pp. 382-389 2013.

A. Das, S. L. Waslander, (2014). Scan registration using segmented region growing NDT. The International Journal of Robotics Research, 33(13), 1645-1663 2014.

D. M. Rosen, J. Mason and J. J. Leonard, "Towards lifelong feature-based mapping in semi-static environments," 2016 IEEE International Conference on Robotics and Automation (ICRA), Stockholm, 2016, pp. 1063-1070 2016.

* cited by examiner

A tile of 2D feature map

As vehicle moves from point A to B, tiles are dynamically loaded

METHOD AND SYSTEM FOR LOCALIZATION OF AN AUTONOMOUS VEHICLE IN REAL-TIME

RELATED APPLICATION DATA

The present application is a continuation of U.S. patent application Ser. No. 16/655,132, filed Oct. 16, 2019, the content of which is incorporated herein by reference.

TECHNICAL FIELD

The present disclosure relates to vehicle localization, and in particular, to a method and system for localization of an autonomous vehicle in real-time.

BACKGROUND

Precise and robust localization of an autonomous vehicle when the autonomous vehicle operates in very different regions can be a significant task. For example, when an autonomous vehicle is operating in a city, an overpass may prevent the vehicle from receiving signals from a GPS satellite. When driving on a highway, a sensor of the autonomous vehicle may not be able to detect enough vertical objects that are located near the highway. Accurate localization of autonomous vehicles in is required for an autonomous vehicle to perform path planning to determine a trajectory for the autonomous vehicle and for decision-making when following the planned trajectory. Localization includes a determination of a location of a vehicle, i.e., a determination of a position of the vehicle in a coordinate system and an orientation of the vehicle.

Localization of an autonomous vehicle can be determined by some known vehicle localization methods by matching static objects, such as curbs, lane markers and building corners in an existing reference map to static objects in an observation an of an environment surrounding the autonomous vehicle generated from real-time sensor data received from sensors mounted to the autonomous vehicle. Static objects with a regular shape (e.g., curbs, lane markers and building corners) are often manually selected as land markers. Although this method can remove useless environmental information, it also hinders adaptability with respect to the surrounding environment of the vehicle. For example, if a pre-defined land marker does not exist in the current observation of the environment surrounding the autonomous vehicle, known vehicle localization methods cannot accurately determine a location of the autonomous vehicle.

Further, dynamic objects and temporary objects can affect the accuracy of vehicle localization. Some existing vehicle localization methods identify dynamic objects within a real-time observation of an environment surrounding the vehicle generated from real-time sensor data received from sensors mounted to the autonomous vehicle using object tracking or object detection methods and remove the detected dynamic objects from the real observation. These vehicle localization methods, however, are require significant amounts of computing resources which can result in a significant demand on the limited computing resources of an autonomous vehicle. For example, a significant computing resources are required to run machine-learning algorithms that perform object tracking and object detection.

Most known vehicle localization methods can only perform 2D localization of the autonomous vehicle, which means that these methods only generate the 2D position [x, y] and a yaw angle θ of the autonomous vehicle. The elevation [z], roll and pitch of the autonomous vehicle are still unknown. In autonomous driving, an accurate representation of the vehicle's location is required. Hence, existing methods cannot fully satisfy the requirements of autonomous driving in an efficient and robust manner.

For the foregoing and other reasons, improvements in vehicle localization are desirable.

SUMMARY

In accordance with one aspect of the present disclosure, there is provided a method for localization of an autonomous vehicle. The method comprises: receiving a three-dimensional (3D) point cloud of an environment surrounding the autonomous vehicle captured by a light detection and ranging (LIDAR) scanning system of the autonomous vehicle; generating a two-dimensional (2D) image of the environment based on the 3D point cloud, the 2D image comprising a plurality of pixels, wherein each respective pixel of the plurality of pixels has at least one of: a first channel indicative of a vertical distribution value of the pixel and a second channel indicative of an intensity value of the pixel; estimating a position of the vehicle by applying a particle filtering process on the 2D image; retrieving odometry data from a wheel odometry unit of the autonomous vehicle, the odometry data comprising rotation data indicative of rotation of the autonomous vehicle and translation data indicative of a translation of the autonomous vehicle; generating a location of the autonomous vehicle, the location of the autonomous vehicle comprising a final position of the vehicle determined based on the odometry data and the estimated position of the autonomous vehicle and an elevation of the vehicle determined based on the final position of the autonomous vehicle and a 2D reference map of the environment.

In some or all examples of the first aspect, the method further comprises estimating a yaw angle value of the autonomous vehicle based on the 2D image; determining a final yaw angle of the autonomous vehicle based on the odometry data and the estimated yaw angle value of the vehicle; and the location of the autonomous vehicle further comprises the final yaw angle of the vehicle.

In some or all examples of the first aspect, the method further comprises retrieving further odometry data from an inertial measurement unit (IMU) of the autonomous vehicle, the further odometry data comprising three-axis angular velocity of the autonomous vehicle and three-axis acceleration of the autonomous vehicle and wherein the final position of the autonomous vehicle is further determined based on the further odometry data retrieved from the IMU.

In some or all examples of the first aspect, the method further comprises determining a final roll value and a final pitch of the vehicle based on the data retrieved from the IMU and the location of the vehicle further comprises the final roll value and the final pitch value of the vehicle.

In some or all examples of the first aspect, the final position of the autonomous vehicle is determined using an Extended Kalman filter (EKF).

In some or all examples of the first aspect, the final yaw angle value of the autonomous vehicle is determined using an Extended Kalman filter (EKF).

In some or all examples of the first aspect, the 3D point cloud comprises a plurality of data points, each data point has an intensity value and a set of coordinates, and generating a two-dimensional (2D) image of the environment based on the 3D point cloud comprises: dividing the 3D point cloud along a plane into a plurality of titles; dividing each tile into a plurality of cells, wherein each cell has a length T along a z-axis of a coordinate system, the length T being defined by an upper bound and a lower bound in parallel with a ground surface of the 3D point cloud, and wherein each of the plurality of cells has a 2D position [$x_k^L$, $y_k^L$] based on the coordinate system and a yaw angle value $\theta^L$; for each cell in each tile: dividing the cell along the length T into a plurality of s blocks of equal heights; for each of the plurality of s blocks, assigning a value of 1 responsive to the block containing at least one data point from the 3D point cloud, and assigning a value of 0 responsive to the block not containing any data point from the 3D point cloud, such that an s-bit binary sequence is generated for each of the plurality of cells, and each binary digit in the s-bit binary sequence is equivalent to the assigned value of a corresponding block in the plurality of s blocks of the cell; converting the s-bit binary sequence into a corresponding decimal number and save the corresponding decimal number in the first channel of a data set representing the cell; responsive to the cell being determined to be flat, determining an intensity value based on a maximum intensity value of one or more data points within the cell and saving the intensity value in the second channel of the data set representing the cell; responsive to the cell being determined to be not flat, assigning a value of 0 in the second channel of the data set representing the cell; and for each tile, generating a 2D image of the 3D point cloud based on the data set representing each cell.

In some or all examples of the first aspect, the method further comprises sorting the pixels of the 2D image based on the value of the first channel of each pixel in the 2D image, and selecting from the sorted pixels the first m hundred pixels as the plurality of key points for vertical distribution for the 2D image, wherein each key point has a vertical distribution value $v_i^{vert}$, i=1, 2, . . . , m, $v_i^{vert}$ equal to the respective value of the respective first channel of the key point; sorting from largest to smallest, the plurality of pixels based on the respective value of the respective second channel of each of the plurality of pixels, and select from the sorted pixels the first/hundred pixels as the plurality of key points for intensity for the 2D image, wherein each key point has an intensity value $v_i^{vert}$, i=1, 2, . . . , l, $v_i^{inte}$ equal to the respective value of the respective second channel of the key point; for each key point for vertical distribution in the 2D image, calculating and storing an importance gain value for the key point for vertical distribution; calculating and storing the vertical distribution weight value for the 2D image based on the importance gain value of at least one key point for vertical distribution; calculating and storing the intensity weight value for the 2D image based on at least one key point for intensity; and updating one or both of the vertical distribution weight value and the intensity weight value based on at least an information entropy value of one or both of the vertical distribution weight value and the intensity weight value.

In some or all examples of the first aspect, for each key point in the 2D image, the importance gain value for the key point for vertical distribution is represented by a value $\alpha_{ij}$ is determined in accordance with the following equation: $\alpha_{ij} = -N_{ij} + N_{max} + k$, wherein i denotes a row number of the key point within the 2D image, j denotes a column number of the key point within the 2D image, $N_{max}$ denotes a total number of points in the 2D image that has the highest points in the 2D image, and $N_{min}$ denotes a total number of points in the 2D image that has the least non-zero points in the 2D image, and k is a positive integer.

In some or all examples of the first aspect, the vertical distribution weight value is represented by $w_i^{vert}$ and determined by the equation: $w_i^{vert} = \sum_{k=1}^{n} \alpha_k \cdot \mu_k^{vert} \cdot v_k^{vert}$, where k is an integer from 1 to n, n is a total number m of key points for vertical distribution in the respective 2D image, $v_k^{vert}$ is the vertical distribution value of the key point, $\alpha_k$ is the importance gain value for the key point for vertical distribution, and $\mu_k^{vert}$ is a corresponding vertical distribution value for the key point from the 2D reference map; and for each key point in the 2D image, the intensity weight value is represented by $w_i^{inte}$ as defined by the equation: $w_i^{inte} = \sum_{k=1}^{n} \mu_k^{inte} \cdot v_k^{inte}$, where k is an integer from 1 to n, n is a total number l of key points for intensity in the 2D image, $v_k^{inte}$ is the intensity value of the key point, and $\mu_k^{inte}$ is a corresponding intensity value for the key point from the 2D reference map.

In some or all examples of the first aspect, estimating a position of the autonomous vehicle by applying a particle filtering process on the 2D image a particle filter process comprises: updating, one or both of the vertical distribution weight value $w_i^{vert}$ and the intensity weight value $w_i^{inte}$ based on at least the information entropy value of one or both of the vertical distribution weight value $w_i^{vert}$ and the intensity weight value $w_i^{inte}$; wherein the information entropy value $H^{vert}$ for the vertical distribution weight value is determined in accordance with the following equation:

$$H^{vert} = 1 + \frac{1}{\log_{10} N} \sum_{i=1}^{N} w_i^{vert} \cdot \log_{10} w_i^{vert},$$

i is an integer from 1 to N, N is a total number of particles in the particle filter, and $w_i^{vert}$ is the vertical distribution weight value of the $i^{th}$ particle; wherein the information entropy value $H^{inte}$ for the intensity weight value is determined in accordance with the following equation:

$$H^{inte} = 1 + \frac{1}{\log_{10} N} \sum_{i=1}^{N} w_i^{inte} \cdot \log_{10} w_i^{inte},$$

i is an integer from 1 to N, N is the total number of particles in the particle filter, and $w_i^{inte}$ is the intensity weight value of the $i^{th}$ particle; and responsive to one or both of $H^{vert}$ and $H^{inte}$ being less than a given threshold, the update of one or both of the corresponding vertical distribution weight value $w_i^{vert}$ and the corresponding intensity weight value $w_i^{inte}$ is skipped and a merged weight $w_i^{merg}$ is used to resample all particles in the particle filter, and wherein the merged weight $w_i^{merg}$ is defined based on the equation:

$$w_i^{merg} = \frac{H^{vert} \cdot w_i^{vert} + H^{inte} \cdot w_i^{inte}}{H^{vert} + H^{inte}}.$$

In some or all examples of the first aspect, the total number of particles in the particle filter has a pre-determined value.

In some or all examples of the first aspect, the corresponding vertical distribution value for the key point from the 2D reference map is obtained by locating a corresponding pixel in the 2D reference map based on the map coordinate of the pixel in the 2D reference map.

In some or all examples of the first aspect, the method further comprises: determining a maximum elevation $h_{max}$ of a cell and a minimum elevation $h_{min}$ of the cell; determining that the cell is flat responsive to the difference between $h_{max}$ and $h_{min}$ being less than a given threshold $h_{th}$, where $h_{max}$ is determined based on a height of a data point in the cell that has the highest elevation from ground among all data points in the cell; and where $h_{min}$ is determined based on a height of a data point in the cell that has the lowest elevation from ground among all data points in the cell.

In some or all examples of the first aspect, the location of the vehicle is output at a frequency that is equivalent to a frequency that the further odometry data is obtained by the IMU.

In some or all examples of the first aspect, the method further comprises prior to generating the 2D image, processing the 3D point cloud to untwist the 3D point cloud.

In some or all examples of the first aspect, the method further comprises dynamically download one or more tiles of the 2D reference map based on the initial position of the vehicle.

In some or all examples of the first aspect, each of the one or more tiles of the 2D reference map is a square tile having a side length between 20 to 200 meters.

In accordance with a second aspect of the present disclosure, there is provided a system for localization of an autonomous vehicle, the system comprising: a processor; and a memory coupled to the processor, the memory tangibly storing thereon executable instructions that, in response to execution by the processor, cause the processor to: receive a three-dimensional (3D) point cloud of an environment surrounding the autonomous vehicle captured by a light detection and ranging (LIDAR) scanning system of the autonomous vehicle; generate a two-dimensional (2D) image of the environment based on the 3D point cloud, the 2D image comprising a plurality of pixels, wherein each respective pixel of the plurality of pixels has at least one of: a first channel indicative of a vertical distribution value of the pixel and a second channel indicative of an intensity value of the pixel; estimate a position of the vehicle by applying a particle filtering process on the 2D image; retrieve odometry data from a wheel odometry unit of the autonomous vehicle, the odometry data comprising rotation data indicative of rotation of the autonomous vehicle and translation data indicative of a translation of the autonomous vehicle; generate a location of the autonomous vehicle, the location of the autonomous vehicle comprising a final position of the vehicle determined based on the odometry data and the estimated position of the autonomous vehicle and an elevation of the vehicle determined based on the final position of the autonomous vehicle and a 2D reference map of the environment.

In accordance with a third aspect of the present disclosure, there is provided a method for localization of an autonomous vehicle, the method performed by a vehicle control system of the autonomous vehicle, the method comprising: obtaining an initial position of the vehicle from a global positioning unit of the autonomous vehicle; obtaining a two-dimensional (2D) feature map based on the initial position of the autonomous vehicle, the 2D feature map corresponding to a region-scale three dimensional point cloud for region that includes the environment; obtaining a three-dimensional (3D) point cloud of an environment surrounding the autonomous vehicle; obtaining odometry data of the autonomous vehicle; generating, using a particle filter process, an estimate of the pose of the autonomous vehicle based on the 3D point cloud, the 2D feature map and the odometry data; and generating a location of the autonomous vehicle in the environment comprising a final pose of the vehicle determined based on the estimate of the pose of the autonomous vehicle and the odometry data, an elevation of the autonomous vehicle generated based on the final pose of the autonomous vehicle and the 2D feature map, and an orientation of the autonomous vehicle generated based on the odometry data.

In some or all examples of the third aspect, the estimate of the pose of the autonomous vehicle includes an estimated yaw angle value of the autonomous vehicle, and wherein the final pose of the autonomous vehicle comprises a final yaw angle of the autonomous vehicle generated based on the odometry data and the estimated yaw angle value of the vehicle.

In some or all examples of the third aspect, the orientation of the autonomous vehicle comprises a final roll value and a final pitch value of the autonomous vehicle, and wherein the final roll value and the final pitch value are determined by processing the odometry data using an attitude determination algorithm.

In some or all examples of the third aspect, the final pose of the autonomous vehicle is determined by using an Extended Kalman filter (EKF) to integrate the estimate of the pose of the autonomous vehicle with and the odometry data.

In some or all examples of the third aspect, the generating, using the particle filter process, the estimate of the pose of the autonomous vehicle based on the 3D point cloud, the 2D feature map and the odometry data comprises: processing the 3D point cloud of the environment surrounding the autonomous vehicle using the odometry data to generate an untwisted 3D point cloud; processing the 3D untwisted point cloud to generate a 2D image of the environment; and estimating, using the particle filter process, the pose of the autonomous vehicle based on the 2D image of the environment and the 2D feature map.

In some or all examples of the third aspect, the 3D point cloud comprises a plurality of data points, wherein each data point has an intensity value and a set of coordinates, and wherein generating, using the particle filter process, the estimate of the pose of the autonomous vehicle based on the 3D point cloud, the 2D feature map and the odometry data: dividing the 3D point cloud along a plane into a plurality of titles; dividing each tile into a plurality of cells, wherein each cell has a length T along a z-axis of a coordinate system, the length T being defined by an upper bound and a lower bound in parallel with a ground surface of the 3D point cloud, and wherein each of the plurality of cells has a 2D position $[x_k^L, y_k^L]$ based on the coordinate system and a yaw angle value $\theta^L$; for each cell in each tile: dividing the cell along the length T into a plurality of s blocks of equal heights; for each of the plurality of s blocks, assigning a value of 1 responsive to the block containing at least one data point from the 3D point cloud, and assigning a value of 0 responsive to the block not containing any data point from the 3D point cloud, such that an s-bit binary sequence is generated for each of the plurality of cells, and each binary digit in the s-bit binary sequence is equivalent to the assigned value of a corresponding block in the plurality of s blocks of the cell; converting the s-bit binary sequence into a corresponding decimal number and save the corresponding decimal number in the first channel of a data set representing the cell; responsive to the cell being determined to be flat, determining an intensity value based on a maximum intensity value of one or more data points of the 3D point cloud that are within the cell and saving the intensity value in the second channel of the data set representing the cell; responsive to the cell being determined to be not flat, assigning a value of 0 in the second channel of the data set representing the cell; generating the 2D image of the 3D point cloud based on the data set representing each cell for each tile.

In some or all examples of the third aspect, the method further comprises: sorting the pixels of the 2D image based on the value of the first channel of each pixel in the 2D image, and selecting from the sorted pixels the first m hundred pixels as the plurality of key points for vertical distribution for the 2D image, wherein each key point has a vertical distribution value $v_i^{vert}$, i=1, 2, ..., m, $v_i^{vert}$ equal to the respective value of the respective first channel of the key point; sorting from largest to smallest, the plurality of pixels based on the respective value of the respective second channel of each of the plurality of pixels, and select from the sorted pixels the first l hundred pixels as the plurality of key points for intensity for the 2D image, wherein each key point has an intensity value $v_i^{inte}$, i=1, 2, ..., l, $v_i^{inte}$ equal to the respective value of the respective second channel of the key point; for each key point for vertical distribution in the 2D image, calculating and storing an importance gain value for the key point for vertical distribution computing and storing the vertical distribution weight value for the 2D image based on the importance gain value of at least one key point for vertical distribution; computing and storing the intensity weight value for the 2D image based on at least one key point for intensity; and updating one or both of the vertical distribution weight value and the intensity weight value based on at least an information entropy value of one or both of the vertical distribution weight value and the intensity weight value.

In some or all examples of the third aspect, for each key point in the 2D image, the importance gain value for the key point for vertical distribution is represented by a value $\alpha_{ij}$ and is determined in accordance with the following equation:

$$\alpha_{ij} = -N_{ij} + N_{max} + k$$

wherein i denotes a row number of the key point within the 2D image, j denotes a column number of the key point within the 2D image, $N_{max}$ denotes a total number of points in the 2D image that has the highest points in the 2D image, and $N_{min}$ denotes a total number of points in the 2D image that has the least non-zero points in the 2D image, and k is a positive integer.

In some or all examples of the third aspect, wherein the vertical distribution weight value is represented by $w_i^{vert}$ and determined by the equation:

$$w_i^{vert} = \sum_{i=1}^{n} \alpha_k \cdot \mu_k^{vert} \cdot v_k^{vert},$$

wherein k is an integer from 1 to n, n is a total number m of key points for vertical distribution in the respective 2D image, $v_k^{vert}$ is the vertical distribution value of the key point, $\alpha_k$ is the importance gain value for the key point for vertical distribution, and $\mu_k^{vert}$ is a corresponding vertical distribution value for the key point from the 2D feature map; and wherein for each key point in the 2D image, the intensity weight value is represented by $w_i^{inte}$ as defined by the equation:

$$w_i^{vert} = \sum_{i=1}^{n} \mu_k^{inte} \cdot v_k^{inte},$$

wherein k is an integer from 1 to n, n is a total number l of key points for intensity in the 2D image, $v_k^{inte}$ is the intensity value of the key point, and $\mu_k^{inte}$ is a corresponding intensity value for the key point from the 2D feature map.

In some or all examples of the third aspect, the method further comprises estimating the pose of the autonomous vehicle by:

updating, one or both of the vertical distribution weight value $w_i^{vert}$ and the intensity weight value $w_i^{inte}$ based on at least the information entropy value of one or both of the vertical distribution weight value $w_i^{vert}$ and the intensity weight value $w_i^{inte}$;

wherein the information entropy value $H^{vert}$ for the vertical distribution weight value is determined in accordance with the following equation:

$$H^{vert} = 1 + \frac{1}{\log_{10} N} \sum_{i=1}^{N} w_i^{vert} \cdot \log_{10} w_i^{vert},$$

wherein i is an integer from 1 to N, N is a total number of particles in the particle filter, and $w_i^{vert}$ is the vertical distribution weight value of the $i^{th}$ particle;

wherein the information entropy value $H^{inte}$ for the intensity weight value is determined in accordance with the following equation:

$$H^{inte} = 1 + \frac{1}{\log_{10} N} \sum_{i=1}^{N} w_i^{inte} \cdot \log_{10} w_i^{inte},$$

wherein i is an integer from 1 to N, N is the total number of particles in the particle filter, and $w_i^{inte}$ is the intensity weight value of the $i^{th}$ particle; and wherein responsive to one or both of $H^{vert}$ and $H^{inte}$ is less than a given threshold, the update of one or both of the corresponding vertical distribution weight value $w_i^{vert}$ and the corresponding intensity weight value $w_i^{inte}$ is skipped and a merged weight $w_i^{merg}$ is used to resample all particles in the particle filter, and wherein the merged weight $w_i^{merg}$ is defined based on the equation:

$$w_i^{merg} = \frac{H^{vert} \cdot w_i^{vert} + H^{inte} \cdot w_i^{inte}}{H^{vert} + H^{inte}}.$$

In some or all examples of the third aspect, the total number of particles in the particle filter has a pre-determined value.

In some or all examples of the third aspect, the corresponding vertical distribution value for the key point in the 2D image is obtained by locating a corresponding pixel in the 2D feature map based on the map coordinate of the pixel in the 2D feature map.

In some or all examples of the third aspect, the method further comprises: determining a maximum elevation $h_{max}$ of a cell and a minimum elevation $h_{min}$ of the cell; determining that the cell is flat responsive to the difference between $h_{max}$ and $h_{min}$ is less than a given threshold $h_{th}$; wherein $h_{max}$ is determined based on a height of a data point in the cell that has the highest elevation from ground among all data points in the cell; and wherein $h_{min}$ is determined based on a height of a data point in the cell that has the lowest elevation from ground among all data points in the cell.

In some or all examples of the third aspect, the location of the autonomous vehicle is output at a frequency that is equivalent to a frequency that the further odometry data is obtained by an inertial measurement unit (IMU) of the autonomous vehicle.

In some or all examples of the third aspect, the obtaining the 2D feature map comprises downloading one or more tiles of the 2D feature map based on the initial position of the vehicle.

In some or all examples of the third aspect, each of the one or more tiles of the 2D feature map is a square tile having a side length between 20 to 200 meters.

In accordance with a fourth aspect of the present disclosure, there is provided a system for localization of an autonomous vehicle, the system comprising: a processor; and a memory coupled to the processor, the memory tangibly storing thereon executable instructions that, responsive to execution by the processor, configure the processor to: obtain an initial position of the vehicle from a global positioning unit of the autonomous vehicle; obtain a two dimensional (2D) feature map based on the initial position of the autonomous vehicle, the 2D feature map corresponding to a region-scale three dimensional point cloud for region that includes the environment; obtain a three-dimensional (3D) point cloud of an environment surrounding the autonomous vehicle; obtain odometry data of the autonomous vehicle; generate, using a particle filter process, an estimate of the pose of the autonomous vehicle based on the 3D point cloud, the 2D feature map and the odometry data; and generate a location of the autonomous vehicle in the environment comprising a final pose of the vehicle determined based on the estimate of the pose of the autonomous vehicle and the odometry data, an elevation of the autonomous vehicle generated based on the final pose of the autonomous vehicle and the 2D feature map, and an orientation of the autonomous vehicle generated based on the odometry data.

In accordance with a further aspect of the present disclosure, there is provided a non-transitory machine-readable medium having tangibly stored thereon executable instructions for execution by one or more processors. The executable instructions, in response to execution by the one or more processors, cause the one or more processors to perform the methods described above and herein.

Other aspects and features of the present disclosure will become apparent to those of ordinary skill in the art upon review of the following description of specific implementations of the application in conjunction with the accompanying figures.

DESCRIPTION OF EXAMPLE EMBODIMENTS

The present disclosure is made with reference to the accompanying drawings, in which embodiments are shown. However, many different embodiments may be used, and thus the description should not be construed as limited to the embodiments set forth herein. Rather, these embodiments are provided so that this disclosure will be thorough and complete. Like numbers refer to like elements throughout, and prime notation is used to indicate similar elements, operations or steps in alternative embodiments. Separate boxes or illustrated separation of functional elements of illustrated systems and devices does not necessarily require physical separation of such functions, as communication between such elements may occur by way of messaging, function calls, shared memory space, and so on, without any such physical separation. As such, functions need not be implemented in physically or logically separated platforms, although they are illustrated separately for ease of explanation herein. Different devices may have different designs, such that although some devices implement some functions in fixed function hardware, other devices may implement such functions in a programmable processor with code obtained from a machine readable medium.

For convenience, the present disclosure describes example embodiments of methods and systems for localization of an autonomous vehicle. An autonomous vehicle may be any type of vehicle, such as a motor vehicle, such as a car, truck, bus, boat or ship, submarine, aircraft, warehouse equipment, construction equipment, tractor or other farm equipment. The teachings of the present disclosure are not limited to vehicles, or any particular type of vehicle, and may be applied to other objects, real or virtual, and to vehicles that do not carry passengers as well as vehicles that do carry passengers. The teachings of the present disclosure may also be implemented in non-vehicular mobile robots including, but not limited to, autonomous vacuum cleaners, rovers, lawn mowers, unmanned aerial vehicle (UAV), and other objects. Even though the vehicle control system described herein has been described to facilitate semi or fully autonomous driving, it can also be used for vehicles during non-autonomous driving mode.

Figure 1:
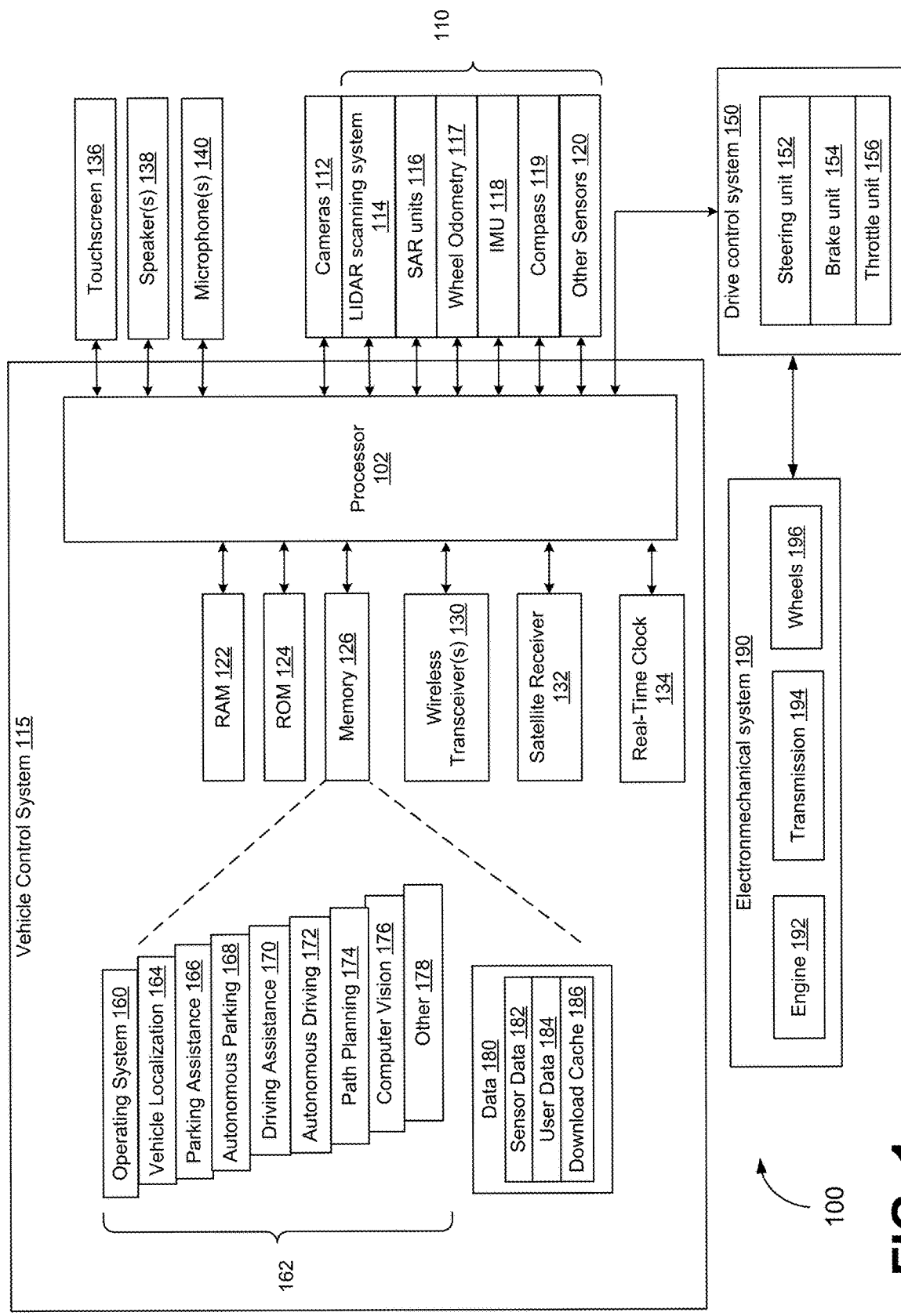
FIG. 1 is a block diagram of a vehicle comprising a vehicle control system in accordance with one example embodiment of the present disclosure.

FIG. 1 illustrates selected components of an autonomous vehicle 100 in accordance with an example embodiment of the present disclosure. The vehicle 100 comprises a vehicle control system 115 that is connected to sensors 110, a drive control system 150 and a mechanical system 190. The vehicle 100 also comprises various structural elements such as a frame, doors, panels, seats, windows, mirrors and the like that are known in the art but that have been omitted from the present disclosure to avoid obscuring the teachings of the present disclosure. The sensors 110 are mounted to structural elements of the vehicle 100 at various locations on the vehicle 100.

The vehicle control system 115 includes a processor 102 that is coupled to a plurality of internal components of the vehicle 100 via a communication bus (not shown). The processor 102 is coupled to a Random Access Memory (RAM) 122, Read Only Memory (ROM) 124, persistent (non-volatile) memory 126 such as flash erasable programmable read only memory (EPROM) (flash memory), one or more wireless transceivers 130 for exchanging radio frequency signals with a wireless network, a satellite receiver 132 for receiving satellite signals from a satellite network, a real-time clock 134. The vehicle control system 115 is also coupled to other components of the vehicle 100, including the sensors 110, a touchscreen 136, speaker(s) 138, microphone(s) 140, the drive control system 150, and the mechanical system 190.

The one or more wireless transceivers 130 may comprise one or more cellular (RF) transceivers for communicating with a plurality of different radio access networks (e.g., cellular networks) using different wireless data communication protocols and standards. The vehicle control system 115 may communicate with any one of a plurality of fixed transceiver base stations of a wireless WAN (e.g., cellular network) within its geographic coverage area. The one or more wireless transceiver(s) 130 may send and receive signals over a wireless WAN. The one or more wireless transceivers 130 may comprise a multi-band cellular transceiver that supports multiple radio frequency bands.

The one or more wireless transceivers 130 may also comprise a wireless local area network (WLAN) transceiver for communicating with a WLAN (not shown) via a WLAN access point (AP). The WLAN may comprise a Wi-Fi wireless network which conforms to IEEE 802.11x standards (sometimes referred to as Wi-Fi®) or other communication protocol.

The one or more wireless transceivers 130 may also comprise a short-range wireless transceiver, such as a Bluetooth® transceiver, for communicating with a mobile computing device, such as a smartphone or tablet. The one or more wireless transceivers 130 may also comprise other short-range wireless transceivers including but not limited to Near field communication (NFC), IEEE 802.15.3a (also referred to as Ultra Wideband (UWB)), Z-Wave, ZigBee, ANT/ANT+ or infrared (e.g., Infrared Data Association (IrDA) communication).

The real-time clock 134 may comprise a crystal oscillator that provides accurate real-time information, such as those provided by Atmel Corporation.

The touchscreen 136 comprises a display such as a color liquid crystal display (LCD), light-emitting diode (LED) display or active-matrix organic light-emitting diode (AMOLED) display, with a touch-sensitive input surface or overlay connected to an electronic controller. Additional input devices of the vehicle 100 (not shown) coupled to the processor 102 may also be provided including buttons, switches and dials.

The vehicle control system 115 also includes one or more speakers 138, one or more microphones 140 and one or more data ports 142 such as serial data ports (e.g., Universal Serial Bus (USB) data ports). The system may also include other sensors such as tire pressure sensors (TPSs), door contact switches, light sensors, proximity sensors, etc.

The drive control system 150 serves to control movement of the vehicle 105. The drive control system 150 comprises a steering unit 152, a brake unit 154 and a throttle (or acceleration) unit 156, each of which may be implemented as software modules or control blocks within the drive control system 150. The steering unit 152, brake unit 154 and throttle unit 156 process, when in fully or semi-autonomous driving mode, received path information from a path planning system 174 stored in the memory 126 of the vehicle control system 115 and generate control signals to control the steering, braking and throttle of the vehicle 105, respectively to drive a planned path. The drive control system 150 may include additional components to control other aspects of the vehicle 105 including, for example, control of turn signals and brake lights.

The mechanical system 190 receives control signals from the drive control system 150 to operate the mechanical components of the vehicle 105. The mechanical system 190 effects physical operation of the vehicle 105. The mechanical system 190 comprises an engine 192, a transmission 194 and wheels 196. The engine 192 may be a gasoline-powered engine, a battery-powered engine, a hybrid engine, an electric for example. Other components may be included in the mechanical system 190, including, for example, turn signals, brake lights, fans and windows.

A graphical user interface (GUI) may be rendered and displayed on the touchscreen 136 by the processor 102. A user may interact with the GUI using the touchscreen and optionally other input devices (e.g., buttons, dials) to display relevant information, such as navigation information, driving information, parking information, media player information, climate control information, etc. The GUI may comprise a series of traversable content-specific menus.

The memory 126 of the vehicle control system 115 has stored thereon operating system software 160 that is executed by the processor 102. The memory 126 also has stored thereon a number of software modules collectively referred to as autonomous driving system 162 in addition to the GUI, where each module of the autonomous driving system 162 is software that includes machine-readable instructions executable by the processor 102. The modules of the autonomous driving system 162 include vehicle localization 164 module, parking assistance 166 module, autonomous parking 168 module, driving assistance 170 module for semi-autonomous driving, path planning module 174, perception module 176, and other modules 178. Other modules 178 include for example mapping module, navigation module, climate control module, media player module, telephone module and messaging module, etc. are also stored in the memory 126. In some embodiments, the vehicle localization module 164, when executed by the processor 102, causes the operations of methods described herein to be performed.

Although shown as a separate modules that may be used by the parking assistance module 166, autonomous parking module 168, driving assistance module 170 for semi-autonomous driving, autonomous driving module 172 or path planning module 174, the perception module 176 may be combined with one or more of the other software modules in other embodiments.

The memory 126 also stores a variety of data 180. The data 180 may comprise sensor data 182 sensed by one or more of the sensors 110, user data 184 comprising user preferences, settings and optionally personal media files (e.g., music, videos, directions, etc.), and a download cache 186 comprising data downloaded via the wireless transceivers 130. For example, the memory 126 may store image data received from the cameras 112, LIDAR data (i.e., a three-dimensional point cloud) received from the LIDAR scanning system 114, SAR data received from the SAR units 116, odometry data from wheel odometry unit 117 and/or an inertial measurement unit (IMU) 118, and data from other sensors 120. The odometry data received from the wheel odometry unit 117 includes rotation data indicative of rotation of the vehicle 100 and translation data indicative of a translation of the vehicle 100. The odometry data received from the IMU 118 includes three-axis angular velocity of the vehicle 100 and three-axis acceleration of the vehicle 100.

The download cache 186 may be deleted periodically, for example, after a predetermined amount of time. System software, software modules, specific device applications, or parts thereof, may be temporarily loaded into a volatile store, such as RAM 122, which is used for storing runtime data variables and other types of data or information. Data received by the vehicle control system 115 may also be stored in the RAM 122. Although specific functions are described for various types of memory, this is merely one example, and a different assignment of functions to types of memory may also be used.

The vehicle control system 115 comprises a satellite receiver 132 that may use signals received by a satellite receiver from a plurality of satellites in a satellite network to determine its position. The satellite network typically comprises a plurality of satellites which are part of at least one Global Navigation Satellite System (GNSS) that provides autonomous geo-spatial positioning with global coverage. For example, the satellite network may be a constellation of GNSS satellites. Example GNSSs include the United States NAVSTAR Global Positioning System (GPS) or the Russian Global NAvigation Satellite System (GLONASS). Other satellite navigation systems which have been deployed or which are in development include the European Union's Galileo positioning system, China's BeiDou Navigation Satellite System (BDS), the Indian regional satellite navigation system, and the Japanese satellite navigation system.

Figure 2:
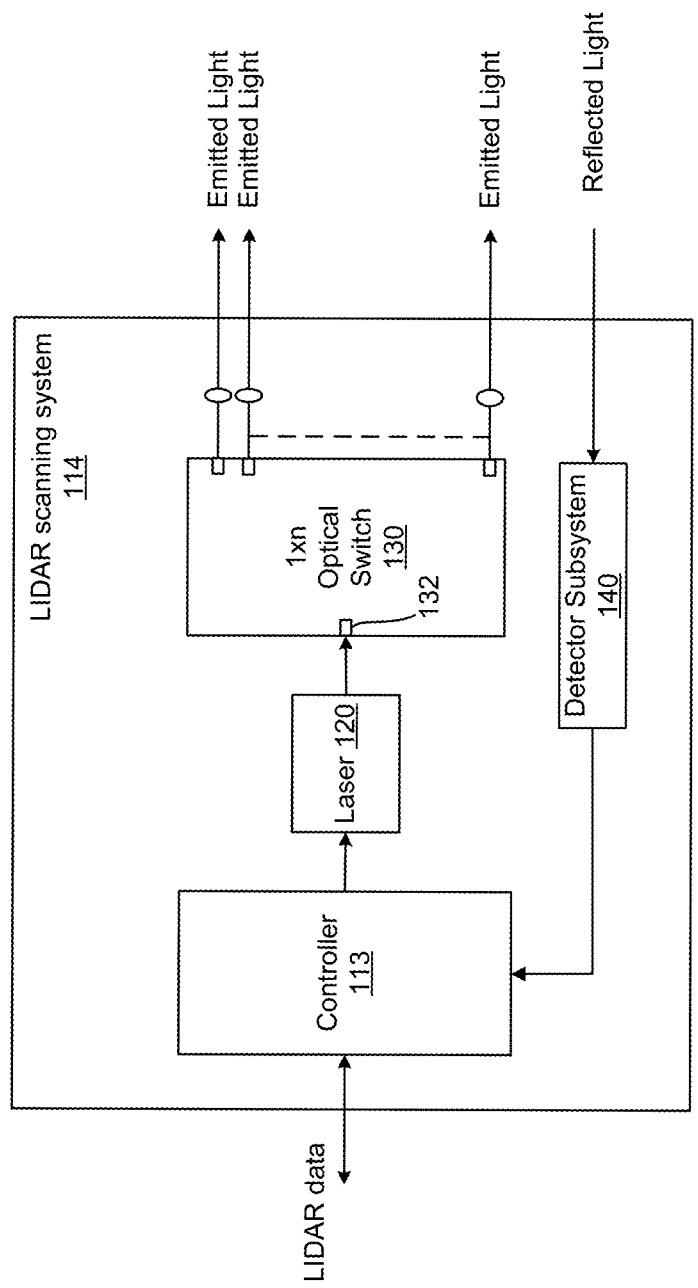
FIG. 2 is a block diagram of a LIDAR scanning system of the autonomous vehicle of FIG. 1 in accordance with one example embodiment of the present disclosure.

FIG. 2 illustrates a simplified block diagram of a LIDAR scanning system 114 of the vehicle 100 in accordance with one example embodiment of the present disclosure.

The LIDAR scanning system 114 comprises a controller 113, including one or more processors (e.g., microprocessors), a laser source 120, an optical switch 130 optically coupled to the laser source 120, and a detector subsystem 140 comprising one or more detectors, such as one more avalanche photodiodes (APDs), charge-coupled device (CCD) sensors, complementary metal-oxide-semiconductor (CMOS) sensors, or micro-electro-mechanical systems (MEMS) sensors.

The laser source 120, comprising one or more lasers, is configured to generate and transmit laser light, such as a laser beam. The laser source 120 may generate Gaussian beams. The laser source 120 may transmit pulsed laser light (e.g., pulsed beams). The laser source 120 typically emits infrared (IR), such as near infrared (NIR) light, but may emit one or more types of visible light and/or or possibly ultraviolet (UV) light in addition to, or instead of, infrared light. The laser source 120 may comprise a plurality of lasers, each laser being configured to transmit a different type of light. In one example, each laser in the plurality of lasers is configured to transmit a respective one of infrared light or one or more type of visible light. In one example, the plurality of lasers comprises an infrared laser configured to transmit infrared light, a blue laser configured to transmit blue light, a red laser configured to transmit a red light, and a green laser configured to transmit a green light. These laser lights may be controlled to send laser beams simultaneously or non-concurrently.

Those skilled in the art will understand that other light sources, such as an LED, may be adapted to substitute for a laser source. However, such a substitution must account for the system requirements, and may be accompanied by additional modification e.g. collimation, to meet requirements.

The detector subsystem 140 detects reflected laser light using the one or more detectors, generates and outputs a data signal corresponding to the received laser light that is sent to the controller 113. The controller 113 may comprise a digital signal processor (DSP) which uses the output from the detector subsystem 140 to create a determine a distance from the LIDAR scanning system 114 to one or more objects in the environment surrounding the vehicle 100 based on a time between a transmission of beams of laser light (also known as laser beams) and a reception of a reflection of the beams of laser light. An analog-to-digital converter (ADC) may convert the analog signals from the detector subsystem 140 into digital data for further processing by the DSP. The controller 113 may also generate a 3D point cloud of the environment surrounding the vehicle 100 based on the determined distance to one or more objects in the environment. Although a DSP is used in the described embodiment, a Field Programmable Gate Array (FPGA) or other processor may be used in other embodiments. Alternatively, the data generated by the detector subsystem 140 may be sent to the processor 102 of the vehicle control system 115 and the functions of the DSP may be performed by the processor 102 of the vehicle control system.

The controller 113 may control the LIDAR scanning system 114 using one or a combination of software, firmware, hardware or a combination thereof. The software may be executed by the controller 1130. Coding of software for carrying out the functionality described herein is within the scope of a person of ordinary skill in the art provided the present disclosure. Machine readable code executable by the controller 113 to perform the functionality described may be stored in a non-transitory machine readable medium (not shown) of the LIDAR scanning system 114. Alternatively, the functions of the controller 113 may be performed by the processor 102 of the vehicle control system 115.

The detector subsystem 140 is configured to receive light corresponding to the type(s) of light emitted by the laser source 120. When the laser source 120 transmits more than one type of light, the detector subsystem 140 is configured to receive each of the different types of light emitted by the laser source 120 (e.g., by the plurality of lasers). For example, when the LIDAR scanning system 114 comprises an infrared laser to configured to transmit infrared light, a blue laser configured to transmit blue light, a red laser configured to transmit a red light, and a green laser configured to transmit a green light, the detector subsystem 140 comprises one or more infrared detectors configured to receive infrared light reflected from objects in the environment, one or more blue detectors configured to receive blue light reflected from objects in the environment, one or more red detectors configured to receive red light reflected from objects in the environment, and one or more green detectors configured to receive green light reflected from objects in the environment. A receiving optics assembly (not shown) may be provided in front of the one or more detectors of the detector subsystem 140. The one or more detectors of the detector subsystem 140 may be connected to the controller via fibre optic cables (not shown). The mechanism used for the detection of multiple laser lights depends on the desired detailed implementations and requirements and may be based on both coherent (heterodyne and homodyne) or incoherent (intensity based) schemes.

The optical switch 130 is a 1×n optical switch with 1 input port configured to receive laser light from the laser source 120 and multiple output ports. The 1×n optical switch 130, under control of the controller 113, provides a programmable beam that may be used to direct the light beam into n directions. The laser source 120 may be directly optically coupled to the input port of the optical switch 130. Alternatively, the laser source 120 may be optically coupled to the input port of the optical switch 130 via fibre optic cables or the like (not shown).

The optical switch 130 may be constructed using MEMS, liquid crystal on silicon (LCoS), silicon photonics (SiPh) or other suitable construction. The switch architecture may be customized for the best performance of the LIDAR scanning system 114. Depending on the technology employed to fabricate the optical switch 130, a variety of sweeping speeds (i.e., scan rates) may be achieved from sub-hertz to megahertz (MHz). SiPh may offer improved performance compared with other architectures and comparison.

Localization of an autonomous vehicle involves a positioning of a vehicle, i.e., determination of a position of the vehicle in some coordinate system, e.g. [x, y] on a 2D map or [x, y, z] on a 3D map. One way of representing a vehicle's location (i.e., a vehicle's position and orientation) in a 3D space is using a 6 degree-of-freedom (6DOF) representation, which includes a 3D position [x,y,z] of the vehicle in a Cartesian coordinate system and an orientation of the vehicle including roll, yaw and pitch of the vehicle. A 6DOF representation of a location of a vehicle can be determined using LIDAR data obtained from the LIDAR scanning unit 114 of the autonomous vehicle and a 3D reference map. However, determining a 6DOF representation of a location of an autonomous vehicle using a real-time has the following problems in a real world setting: 1) a city-scale 3D reference map is too large to be stored in memory of the autonomous vehicle; 2) it is not feasible to transmit a city-scale 3D reference map to an autonomous vehicle through a cellular data network; and 3) point cloud registration (i.e., a process of rotating and translating a 3D point cloud generated from LIDAR data obtained from the LIDAR scanning unit to overlap with a 3D city-scale 3D reference map) is a very time consuming operation, which is not suitable for execution by the processor 102 of vehicle control system 115 of the vehicle 105.

The present disclosure describes, in some embodiments, a system and method for 6DOF localization of an autonomous vehicle based on a current 3D point cloud received from the LIDAR scanning system of the vehicle. The method may include: 1) retrieving a region-scale 3D point cloud for a region such as a city, a province, or a country; 2) converting the region-scale 3D point cloud into to a 2D reference map; 3) dividing the 2D reference map into a plurality of 2D reference map tiles based on a specific map format; 4) downloading the plurality of 2D reference map tiles to a vehicle; 5) obtaining a current 3D point cloud from a LIDAR scanning system of the vehicle and converting the 3D point cloud to a 2D image; 6) mapping the 2D image to a downloaded 2D reference map tile based on a key point extraction method; 7) determining a 2D position and yaw angle of the vehicle based on the mapping between the 2D image and the downloaded 2D reference map; and 8) generating a final 3D position and orientation of the vehicle based on the 2D position and yaw angle. The final 3D position and orientation can be in a high frequency form. High-frequency herein may refer to a frequency value that is above a minimum threshold, for example, a frequency of at least 50 Hz, and may be as high as 200 Hz in some embodiments.

Figure 6:
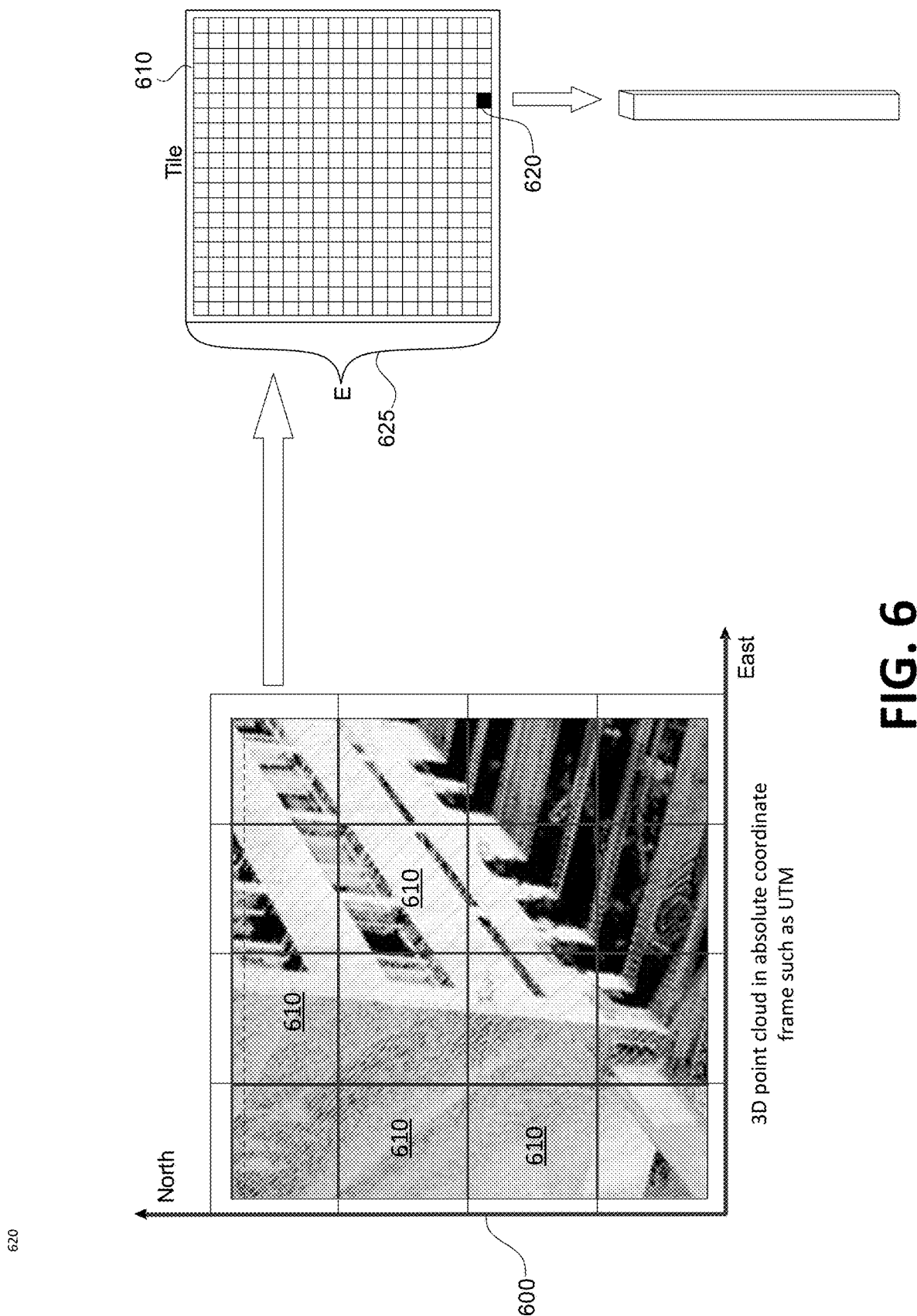
FIG. 6 shows a 3D point cloud and a square tile of a 2D reference map of the 3D point cloud in accordance with one example embodiment of the present disclosure.

The disclosed embodiments use a compact data format that is suitable for storing and transmitting a region-scale 2D reference map to a vehicle over a communication network. The disclosed key point extraction method can effectively eliminate influence of dynamic objects on determining a position of the vehicle. The disclosed embodiments enable the vehicle to readily generate a 6DOF localization using a downloaded 2D reference map, which reduces the computational complexity compared to solutions that require handling of city-scale 3D point cloud in real-time. In some embodiments, the 2D reference map is a 2D reference map. In some embodiments, the 2D reference map is a 2D region-scale image map (i.e., a map in image format). The 2D region-scale image map generated from a 3D region-scale point cloud map. A 3D region-scale point cloud map may be generated by combining previously captured observations of the environment, where each observation is a 3D point cloud. The generation of a Generation of Region-Scale 2D Reference Map Referring now to FIG. 6, which shows a is region-scale three-dimensional (3D) point cloud 600 and a tile 610 within the region-scale 3D point cloud 600 in accordance with one example embodiment of the present disclosure. The region-scale 3D point cloud 600 is a region-scale (e.g. a city, a province, or a country) 3D point cloud obtained by land survey. The size of the region-scale 3D point cloud 600 is very large and not suited for storage in the memory 126 of the vehicle or processing in real-time by the processor 102 of the vehicle 105. Therefore, in order to use the region-scale 3D point cloud 600 for localization of the vehicle 100, the region-scale 3D point cloud 600 is converted into a 2D reference map. The 2D reference map may be divided into a plurality of 2D image tiles as described in further detail below.

The region-scale 3D point cloud 600, in an absolute coordinate frame (e.g. Universal Transverse Mercator coordinate system), is divided along an x-y plane of the coordinate system into a plurality of square tiles 610 of identical size. The length of the sides 625 of each square tile 610 can vary from 20 meters to 200 meters. In the example embodiment shown in FIG. 6, the length of the sides of each square tile 610 is 100 meters. For each square tile 610, the length of the sides of the square tile 610 and absolute position of the square tile 610 can be saved in a data file. In some example embodiments, the respective absolute position of a square tile 610 is a coordinate of the lower left corner of the tile in the UTM coordinate system (or a coordinate in another suitable coordinate system such as latitude/longitude or Military Grid Reference System). Each square tile 610 is further divided into a plurality of cells 620 of identical size. The length of the sides of each cells 620 can range from 0.05 to 0.2 meters. For example, a square tile 610 of 100 m×100 m may have 1,000,000 (i.e., 1000×1000) cells 620. In some example embodiments, a minimal absolute evaluation of the data points of the 3D region-scale point cloud in each square tile 610 is also saved in a data file. A square tile 610 may be referred to as a tile 610 for ease of reference throughout this disclosure.

In a three dimensional space, each cell 620 is a thin column with a square base. A cell 620 may include zero, one, or multiple data points of the 3D region-space point cloud 600. The characters of the data points included in a cell 620 may be parameterized and saved in a data set representing the cell 620. The data set may include two or three channels for each cell 620. For example, the data set may use a RGB colour model to represent parameters of the data points included in the cell 620, as explained below. Each cell 620 has a respective position $[x_k^M, y_k^M]$ in a 2D image coordinate system.

Figure 7:
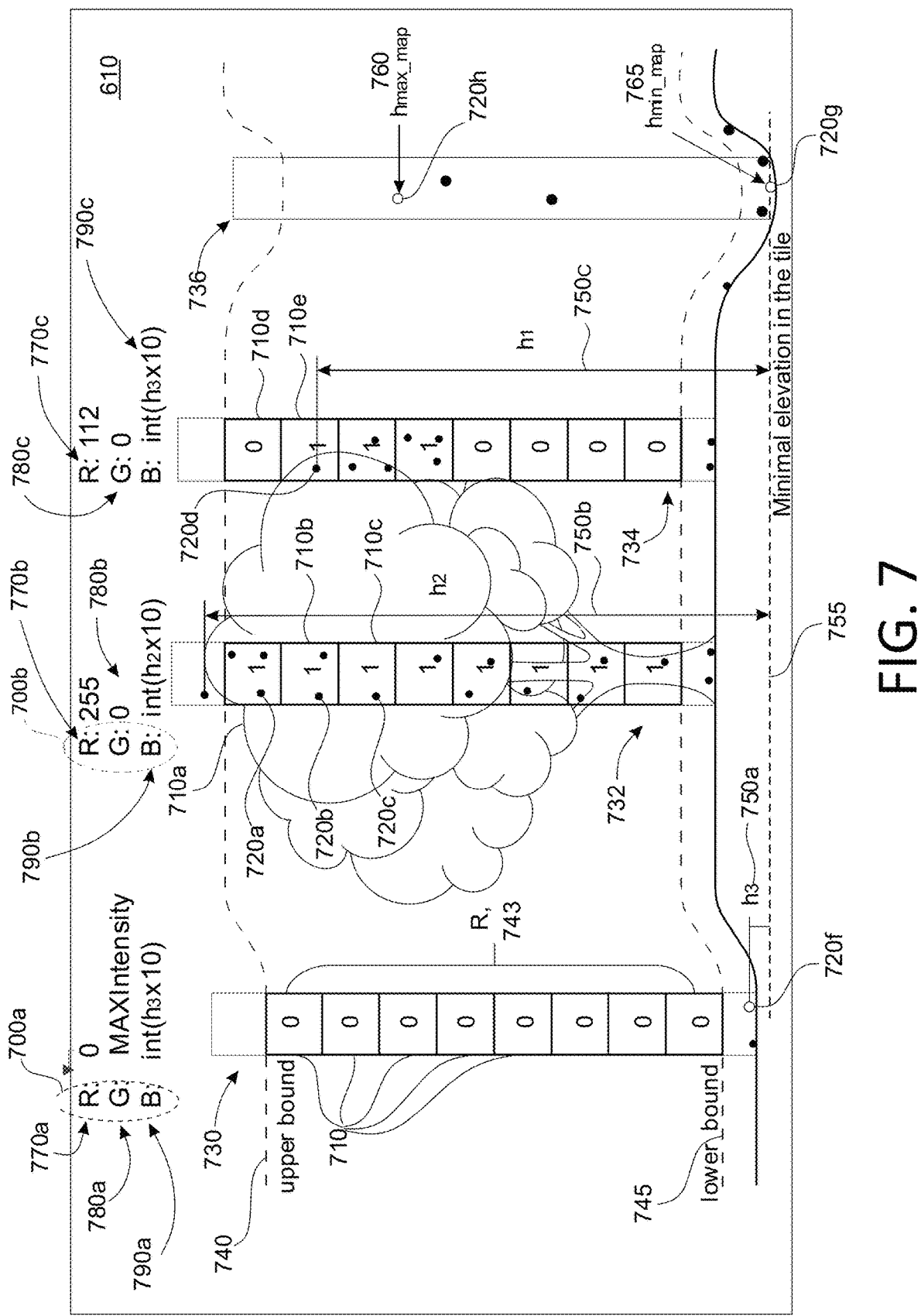
FIG. 7 shows a tile of a 3D region-scale point cloud and data points of a 3D region-scale point cloud within the tile in accordance with one example embodiment of the present disclosure.

FIG. 7 shows a cross-sectional view of a tile 610 and data points 720a, 720b, 720c, 720d, 720e located within the tile 610 in accordance with one example embodiment of the present disclosure. In the example shown in FIG. 7, the tile 610 is illustrated as including four cells 620 for the purposes of describing the method of generating a 2D image map tile from a tile 610 of a 3D region-scale point cloud 600. It will be appreciated that the number of cells 620 included in the tile 610 depends on the length of the sides of the tile 610 and the length of the sides of each cell 620. In FIG. 7, the four cell 620 of tile 610 are shown using reference numerals 730, 732, 734, 736. Characters of the data points included in the cell 730 may be parameterized and saved in a data set 700a representing the cell 730. Similarly, characters of the data points included in the cell are 732 may be parameterized and saved in a data set 700b representing the cell 732; characters of the data points included in the cell 733 may be parameterized and saved in a data set 700c representing the cell 733; and characters of the data points included in the cell 736 may be parameterized and saved in a data set representing the cell 736. In some embodiments, the data sets representing the cells 730, 732, 734, 736 may be structured and stored based on the RGB colour mode. For example, data set 700a representing the cell 730 may include one or more channels of the RGB colour mode, which may include a first channel (R for red) 770a, a second channel (G for green) 780a, and a third channel (B for blue) 790a. Similarly, data set 700b representing cell 732 may include a first channel 770b, a second channel 780b, and a third channel 790b. Data set 700c representing cell 734 may include a first channel 770c, a second channel 780c, and a third channel 790c. It is to be appreciated that even though R/G/B channel may traditionally store data representing colour information of a pixel, in this disclosure, the R/G/B channel may store values representative of other characteristics of each cell 620 in the tile 610.

In some embodiments, the first channel 770a, 770b, 770c included in the data sets 700a, 700b, 700c may store a respective vertical distribution value of the cells 730, 732, 734, the second channel 780a, 780b, 780c included in the data sets 700a, 700b, 700c may store a respective intensity value of the cells 730, 732, 734, and the third channel 790a, 790b, 790c respective may store a respective elevation value of the cell 730, 732, 734, as described below. An intensity value may in some embodiments be a ground intensity value. In other embodiments, an intensity value may refer to intensity of an object that is not the ground.

Each cell 730, 732, 734, 736 may be divided along a vertical axis (e.g. a z-axis) into a plurality of equal-sized blocks 710 between an upper boundary 740 and a lower boundary 745. The upper boundary 740 is used to include most of the common vertical objects. The upper boundary 740 may be defined based on the number of the laser beams of the LIDAR scanning system 114 and vertical field of view of the LIDAR scanning system 114. The lower boundary 745 is used to remove temporary objects. Many low objects, such as garbage on the ground and grass near the road, usually change with the time. For example, the upper boundary 740 may be defined to be 4.5 meters from ground, and the lower boundary 745 may be defined to be 0.5 meters from ground, respectively. A minimum elevation 755 in the tile 610 may be defined based on a data point (from ground) in the cell 620 that has the lowest elevation from ground among all data points in the tile 610. In the embodiment shown in FIG. 7, the minimum elevation 755 is defined by a height of the data point 720g as it has the lowest elevation from ground among all data points in the tile 610. In this example, because the data point 720g touches the ground, the minimum elevation 755 in the tile 610 may be 0.

An elevation height of a data point may be determined based on its position along the z-axis in the coordinate system [x, y, z] of the 3D region-scale data point cloud 600.

As shown in FIG. 7, each cell 730, 732, 734, 736 may be divided into eight blocks 710 between the upper boundary 740 and the lower boundary 745. Each block 710 may contain zero or more data points 720a, 720b, 720c, 720d, 720e, 720f, 720g.

As mentioned, the first channel 770a, 770b, 770c included in the data sets 700a, 700b, 700c may store a respective vertical distribution value of the cells 730, 732, 734. If a tile 610 has n cells, a vertical distribution value $v_i^{vert\_map}$ (i=1 . . . n) of a cell 730, 732, 734 is calculated by: 1) dividing the cells 730, 732, 734 along the length R 743 into a plurality of u blocks (e.g. 8 blocks) of equal heights; 2) for each of the plurality of u blocks, assigning a value of 1 when the block 710a, 710b, 710c, 710e contains at least one data point 720a, 720b, 720c 720d of the tile 610 of the region-scale 3D point cloud 600, and assigning a value of 0 when the block 710 does not contain any data point from the tile 610 of the region-scale 3D point cloud; 3) generating an u-bit (e.g. 8-bit) binary sequence for each of the plurality of cells 730, 732, 734 in the tile 610, where each binary digit in the u-bit is equivalent to the assigned value of a corresponding block in the plurality of u blocks of the cells; and 4) converting the u-bit binary sequence into a corresponding decimal number and storing the corresponding decimal number in the first channel of the cell as the vertical distribution of the cell $v_i^{vert\_map}$ (i=1 . . . n). A conventional conversion method may be used to convert the u-bit binary sequence to a decimal number.

For example, the cell 730 has eight blocks 710 bounded by an upper boundary 740 and lower boundary 745. Data points 720f found beyond the upper and lower boundaries 740, 745 are not captured by the blocks 710, as these data points 720f tend to offer little significance (e.g. garbage or bird) for the vehicle 100 when driving on the ground. Even though the cell 730 includes two data points 720f close to the minimum elevation 755 in the tile 610, the data points 720f which are outside of the upper boundary 740 and lower boundary 745 are not taken into consideration when calculating the vertical distribution value for cell 730. Therefore, the 8-bit binary sequence for the cell 730 is 00000000 and the corresponding vertical distribution value for the cell 730 is 0, is saved in the first channel 770a included in the data set 700a representing the cell 730.

For another example, the cell 732 has eight blocks 710a, 710b, 710c bounded by an upper boundary 740 and lower boundary 745. Similarly, data points found beyond the upper and lower boundaries 740, 745 are not captured by the blocks 710a, 710b, 710c. Block 710a includes at least one data point 720a, block 710b includes at least one data point 720b, and block 710c includes at least one data point 720c. As shown, each block of the cell 732 has at least one data point. Therefore, the 8-bit binary sequence for the cell 732 is 11111111 and the corresponding vertical distribution value for the cell 732 is 255, as saved in the first channel 770b included in the data set 700b representing the cell 732.

For yet another example, the cell 734 has eight blocks 710d, 710e bounded by an upper boundary 740 and lower boundary 745. Similarly, data points found beyond the upper and lower boundaries 740, 745 are not captured by the blocks 710d, 710e. Block 710d does not include any data points, block 710e includes at least one data point 720d, and two more blocks each include at least one data point within. Therefore, the 8-bit binary sequence for the cell 734 is 01110000 and the corresponding vertical distribution value for the cell 730 is 112, is saved in the first channel 770c included in the data set 700b representing the cell 734.

As mentioned, the second channel 780a, 780b, 780c included in the data sets 700a, 700b, 700c may store a respective intensity value of the cells 730, 732, 734. If a tile 610 has n cells, an intensity value $v_i^{inte\_map}$ (i=1 . . . n) of a cell 730, 732, 734 can be calculated based on a maximum elevation height and a minimum elevation height and stored in a second channel included in the data sets 700a, 700b, 700c representing the cells 730, 732, 734. For example, for the cell 736, an intensity value $v_i^{inte\_map}$ (i=1 . . . n) may be generated by: 1) determining a maximum elevation $h_{max\_map}$ 760 of the cell 736 based on a height of the data point 720h that has the highest elevation from ground among all data points in the cell 736; 2) determining a minimum elevation $h_{min\_map}$ 765 of the cell 736, wherein $h_{min\_map}$ is determined based on a height of a data point 720g that has the lowest elevation from ground among all data points in the cell 736; 3) when the difference between $h_{max\_map}$ and $h_{min\_map}$ is less than a given threshold $h_{th\_map}$, an intensity value $v_i^{inte\_map}$ b determined based on a maximum intensity value of one or more data points within the cell 736 and the intensity value $v_i^{inte\_map}$ is saved in the second channel in the data set (not shown) representing the cell 736, and when the difference between $h_{max\_map}$ and $h_{min\_map}$ is equal to or greater than a given threshold $h_{th\_map}$, a value of 0 is assigned to the second channel included in the data set (not shown) representing the cell 736. The given threshold $h_{th\_map}$ is used to determine if a cell is sufficiently flat. A flat cell is usually associated with presence of road surfaces, and an intensity value is an indication of road surface conditions. Therefore, if a cell is not flat, and the intensity value should be zero.

The third channel 790a, 790b, 790c may store a respective elevation value of the cell 730, 732, 734. If a tile 610 has n cells, an elevation height value $v_i^{elev\_map}$ (i=1 . . . n) of a cell 730, 732, 734 can be calculated based on a maximum elevation height $h_i$ 750a, 750b, 750c and a minimum elevation height 755 of tile 610 and stored in a third channel 790a, 790b, 790c included in the data sets 700a, 700b, 700c representing the cells 730, 732, 734. The elevation height value can be generated by: 1) determining and saving a minimum elevation height $h_{MapMinimum}$ 755 of the data points within the tile 610 based on a height of a data point 720g that has the lowest elevation from ground among all data points in the tile 610; 2) determining an elevation height value $v_i^{elev\_map}$ based on calculating the difference between $h_{mapMinimum}$ and the above-mentioned $h_{max\_map}$, where $v_i^{elev\_map} = h_{max\_map} - h_{MapMinimum}$; and 3) storing the elevation value $v_i^{elev\_map}$ in the third channel included in the data set representing the cell.

For example, the cell 730 has an elevation height value $h_3$ 750a stored in the third channel 790a included in the data set 700a representing cell 730, the cell 732 has an elevation height value $h_2$ 750b stored in the third channel 790b included in the data set 700b representing cell 732, and the cell 734 has an elevation height value $h_1$ 750c stored in the third channel 790c included in the data set 700c representing cell 734. Prior storing the elevation height value for each pixel 730, 732, 734 in a respective third channel 790a, 790b, 790c, a conversion method may be applied. An example conversion method that may be applied, which multiplies the respective elevation height value $v_i^{elev\_map}$ 750a, 750b, 750c in meters, by a number (e.g. 10), then obtains the integer value of the result; if the integer value of the result is greater than 255, the integer value of the result can be set to 255.

The data sets 700a, 700b, 700c are used to generate a 2D image tile in which each pixel of the 2D image tile corresponds to a cell 620 of a tile 610 of the 3D region-scale point cloud. Each pixel of the 2D image tile includes a first channel indicative of a vertical distribution value of the pixel and a second channel indicative of an intensity value of the pixel. The vertical distribution value of the pixel is obtained from the first channel included the data set representing the cell 620 and the intensity value of the pixel is obtained from the second channel included in the data set representing the cell 620. Each 2D image tile can be combined to form a 2D region-scale image map (which is referred to herein as a 2D reference map).

Although the example shown in FIG. 7 includes only four cells 620, it will be appreciated that a tile 610 may be divided into any number of cells 620.

Dynamic Downloading of 2D Reference Map Tiles

Figure 8:
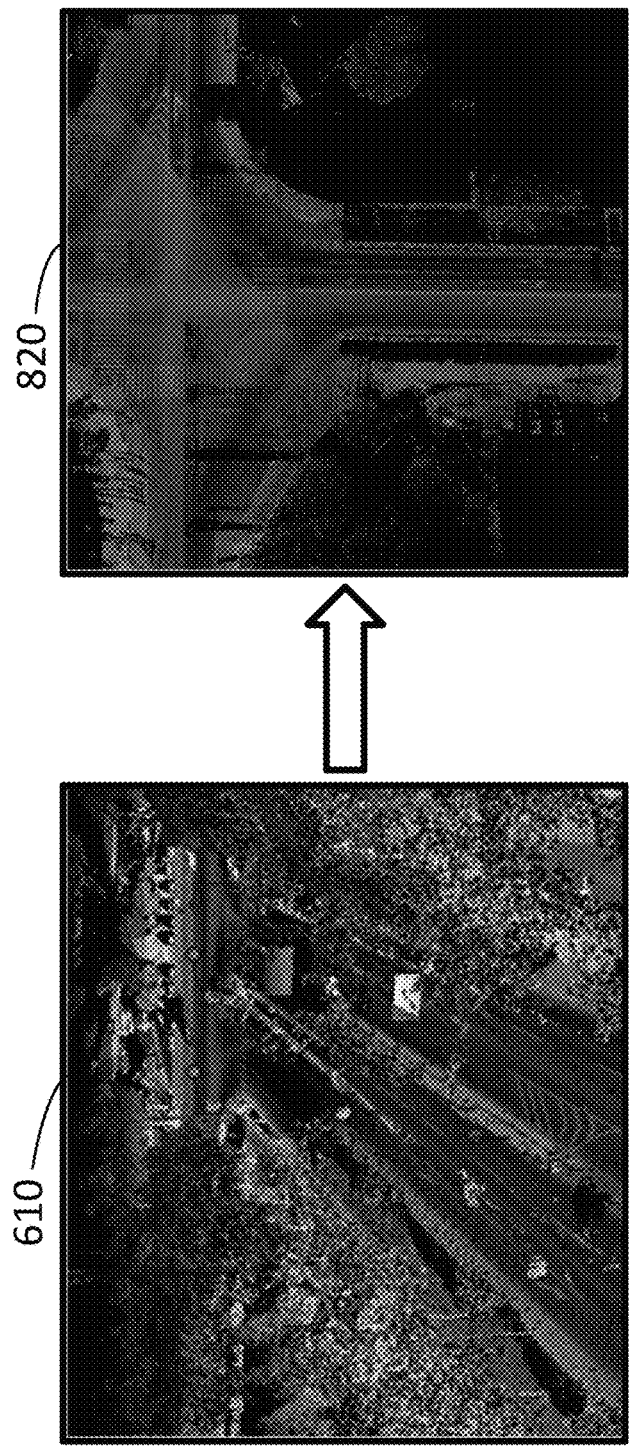
FIG. 8 shows a sample tile of a 3D region-scale point cloud and a corresponding tile of a 2D reference map.

Each tile 610 in the region-scale 3D point cloud 600 can be converted to a 2D image tile between a size of 20 m×20 m to a size of 200 m×200 m, square by square, based on the processes described above. FIG. 8 shows a sample tile 610 of a region-scale 3D point cloud 600, which is processed and converted using the method described above to a corresponding 2D reference map tile 820 based on the methods described above. As shown in In the 2D reference map tile 820, red may be used to indicate a vertical distribution value which represents likely obstacles and objects near the road, green may be used to indicate an intensity of the road surface, and blue may be used to indicate an elevation value of the road surface. In some embodiments, elevations of buildings and trees may be saved in the blue channel.

Figure 9:
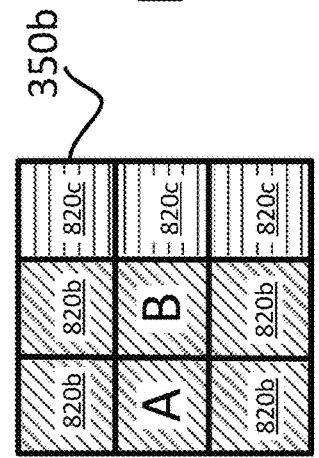
FIG. 9 shows a dynamic loading of 2D tiles of the 2D reference map as a vehicle moves from point A to point B.
Figure 9:
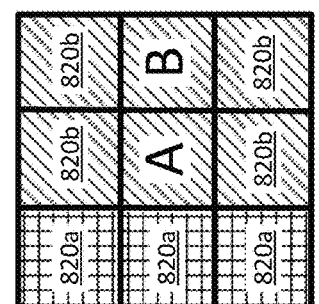

FIG. 9 shows a dynamic downloading of 2D reference map tiles 820a, 820b, 820c by the processor 102 of the vehicle control system 115 of the vehicle 100 as the vehicle 100 moves from position A to position B in an environment. The 2D reference map tiles 820a, 820b, 820c are dynamically downloaded based on the current position of the vehicle 100. In one example embodiment, at any given time, 9 adjacent 2D reference tiles are loaded into the memory 126 of the vehicle control system 115, assuming the position of the vehicle's 100 is kept within the central tile. For example, when the vehicle 100 is at position A, 2D image tiles 820a, 820b of the 2D reference map downloaded from an external server (not shown) or storage device (not shown) to form a loaded 2D reference map 350a. When the vehicle 100 moves from position A to position B, 2D image tiles 820a of the loaded 2D reference map 350a are removed, and new 2D image tiles 820c of the 2D reference map are downloaded, keeping tiles 820b, to form a loaded 2D reference map 350b. In some embodiments, the precise position of the vehicle 100 may be updated in real-time by the localization method 500, and the 2D image tiles 820a, 820b, 820c of the 2D reference map may be dynamically downloaded based on the updated position of the vehicle 100.

Figure 3:
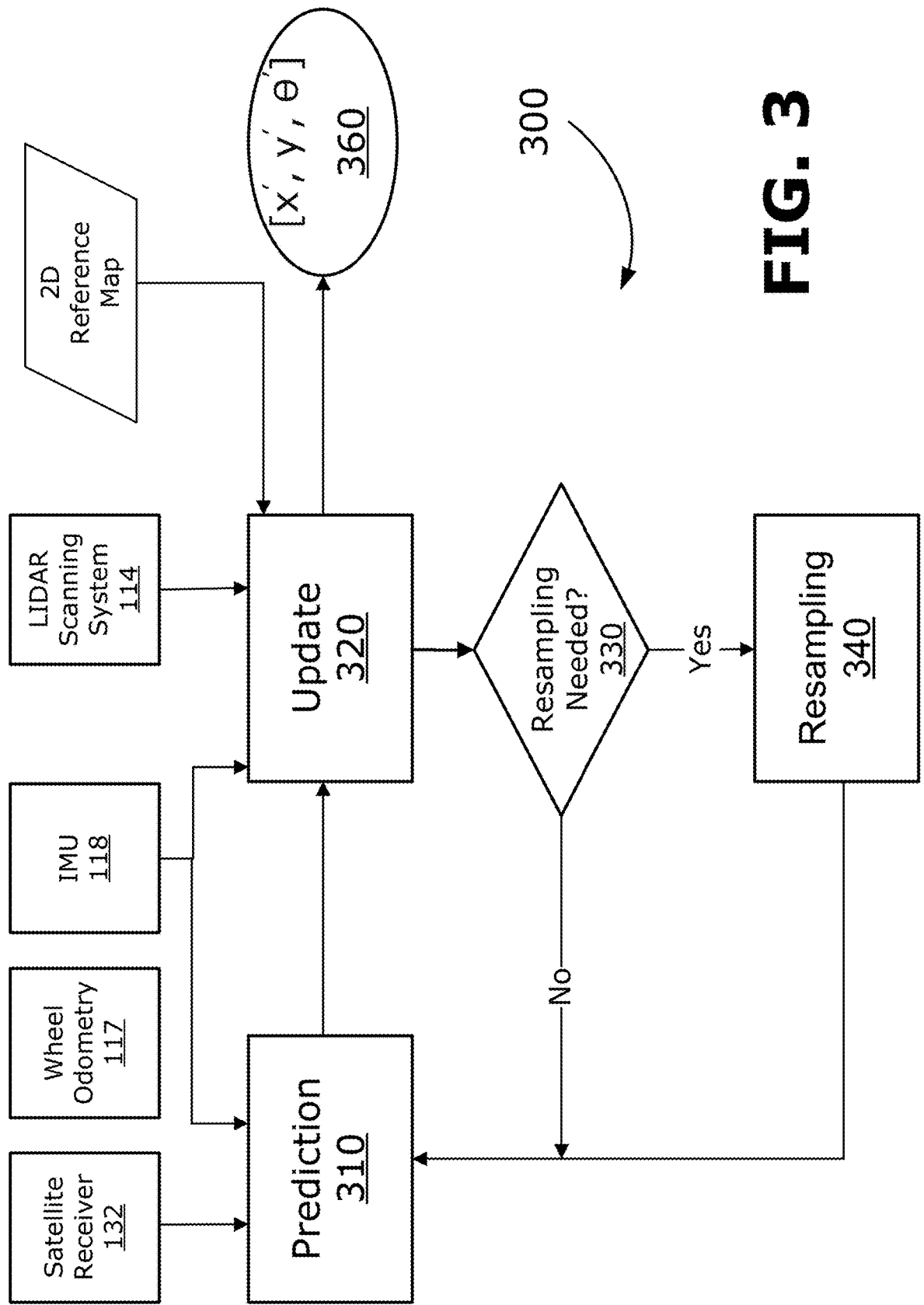
FIG. 3 is a block diagram illustrating a particle filter module to generate a position and yaw angle of an autonomous vehicle in accordance with one example embodiment of the present disclosure.

Referring now to FIG. 3, which a block diagram illustrating a particle filter module 300 of the vehicle localization module 164 to generate a position and yaw angle 360 of a vehicle 105 in accordance with one example embodiment of the present disclosure. The particle filter module 300 is a software module that includes machine-readable instructions, when executed by the processor 102, causes the processor 102 to estimate the position and yaw of the vehicle by continuously calculating the weights of the particles. The particle filter module 300 in an example embodiment shown in FIG. 3 generally includes a prediction module 310, an update module 320, a resampling module 340. In some embodiments, the particle filter module 300 implements the method based on Markov chain Monte Carlo (MCMC) principles.

The prediction module 310 is configured to, during an initialization process of the particle filter, randomly generate a plurality of particles and predict an position [x', y'] and a yaw angle θ' (collectively referred to as a pose) of the vehicle 105. At first, the prediction may be generated based on an initial input from the satellite receiver 132 which may transmit a GPS signal to the processor. The GPS signal may include initial map coordinates [$x_{ini}$, $y_{ini}$] of the vehicle 105. The initial yaw angle $θ_{ini}$ may be determined from odometry data retrieved from wheel odometry unit 117 and IMU 118 of the vehicle 100. In some embodiments, initial yaw angle $θ_{ini}$ may be obtained by matching the coordinate frame fixed on the LIDAR scanning system 114 with the coordinate system of the map.

Based on an initial pose of the vehicle 100, the update module 320 is configured to generate or update respective weight values for the particles based on at least data from a downloaded 2D reference map 350, LIDAR scanning system 114, wheel odometry unit 117 and IMU 118, which is described in detail below in reference to FIG. 4.

Based on one or more information entropy values calculated from the weight values of the particles, resampling may or may not be required 330. If resampling is required, a resampling module 340 is configured to resample the particles and generate a new pose of the vehicle 105 based on the weight values obtained in the update module 320.

The update module 320 outputs weight values for the particles, which are used to generate a low-frequency pose [x', y', θ'] 360 of the vehicle 105. For example, the weighted average of these particles is the pose estimation of the vehicle 105.

Figure 4:
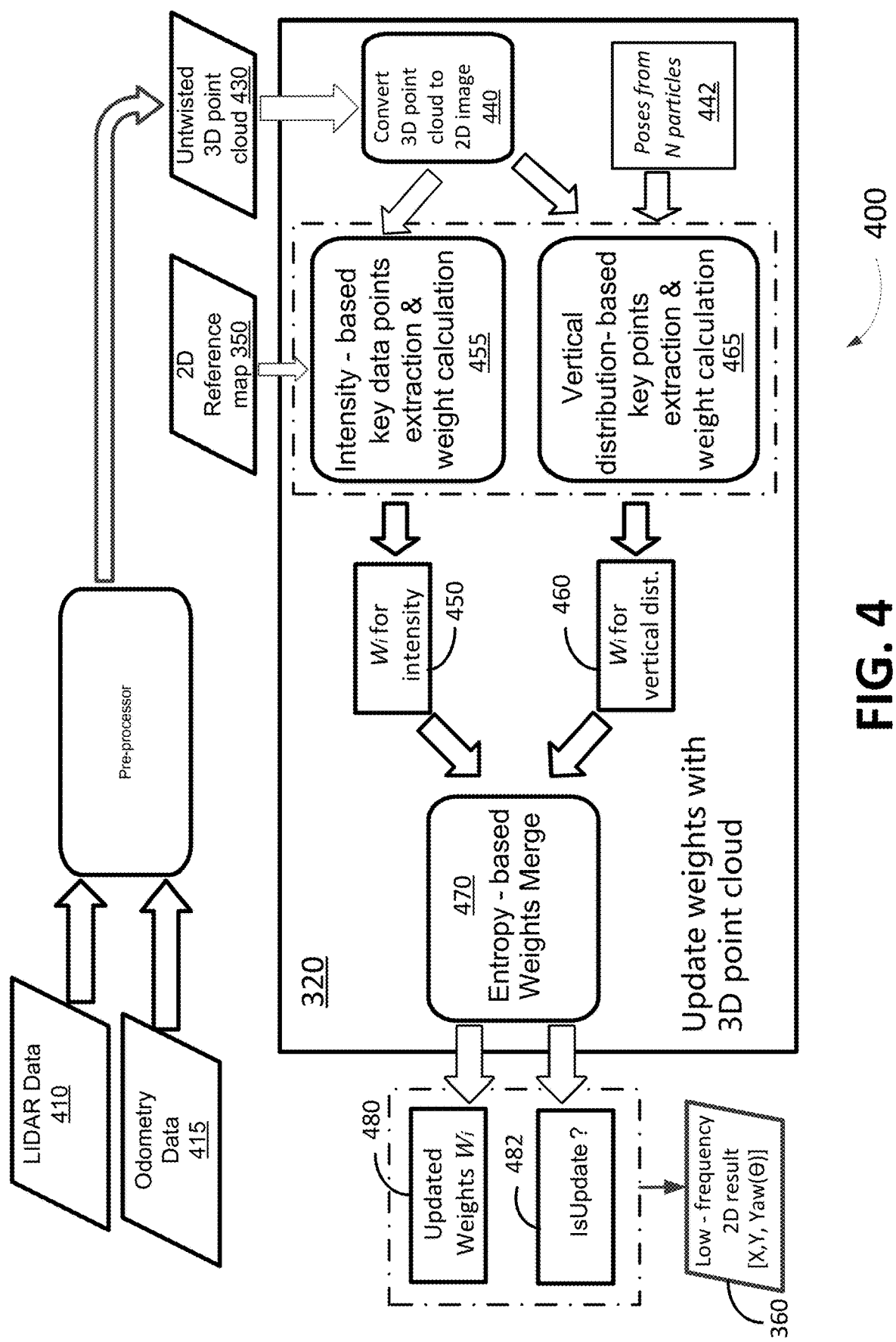
FIG. 4 is a block diagram illustrating an update process performed by the particle filter module in accordance with one example embodiment of the present disclosure.

FIG. 4 is a block diagram illustrating an update process 400 performed in part by the update module 320 in accordance with one example embodiment of the present disclosure. A 3D point cloud 410 may be received from LIDAR scanning system 114 and odometry data 415 may be received from wheel odometry unit 117 and IMU 118. The 3D point cloud 410 represents a current (i.e. real-time) observation of the environment captured by the LIDAR scanning system 114 installed on the vehicle 105 at a specific scanning frequency. For example, a LIDAR scanning system 114 may complete a full scan of the vehicle's immediate surroundings (e.g. within 100-300 meters of the vehicle 100) at a rotation rate of 5-20 Hz.

In some embodiments, the 3D point cloud 410 needs to be pre-processed using the odometry data 415. In step 430, the odometry data 415 can be used to eliminate deformation in the 3D point cloud 410 caused by the motion of the vehicle 100. The process 420 is also known as untwisting. The untwisted 3D point cloud 430 has been transformed so that its origin [0, 0, 0] coincides with the middle point of a rear axis of the vehicle 100 (e.g. base link frame) of the vehicle 100. After the untwisting process 420, the x, y and z axes of the base link frame point to the front, to the left and upward of the body of the vehicle 100, respectively. The untwisted 3D point cloud 430 is then converted by the update module 320 into a 2D image in a similar process as described above with respect to the region-scale 3D point cloud 600, with some differences as described below. For example, the elevation height of a square is not computed here. That is, the pixels within the 2D image converted from the untwisted 3D point cloud 430 only has one or both of a vertical distribution channel and an intensity channel. For another example, there is no need to divide the 3D point cloud 410 or untwisted 3D point cloud 430 into a plurality of tiles prior to converting the 3D point cloud to the 2D image, as the 2D image can be a square tile with a side length of 20-200 meters, e.g. a 100_m_×_100_m square tile. In other embodiments, the 2D image may be a different shape, such as a rectangular shape.

In some embodiments, the LIDAR scanning system 114 of vehicle 105, may be Velodyne™ and Quanergy™ branded LIDAR systems, and may have 8 to 128 laser beams. This means the 2D image of one LIDAR frame is sparser than the 2D reference map 3501, 350b which is generated from a 3D region-scale point cloud which is generated from a survey of a region. Still, a 2D image 1000 generated based on the untwisted 3D point cloud 430 may contain thousands or tens of thousands of non-zero pixels, which can require a significant amount of computing resource to generate. In order to speed up the localization operation, key points are defined and extracted from these non-zero pixels in the 2D image 1000 in accordance with a process described in detail below. The key points of the vertical distribution and intensity channels are extracted separately. For each channel, the values of these non-zero pixels are sorted, and the first few hundred pixels with large values can be chosen as key points. For the channel storing vertical distribution value (also referred to as "vertical distribution channel(s)"), the key points usually correspond to these tall objects, such as trees, buildings, traffic lights, street lights and telephone poles. For the channel storing intensity value (also referred to as "intensity channel(s)"), the key points usually correspond to painting markers on the road.

For the vertical distribution channels, key points have different importance in positioning a vehicle 100. Generally speaking, key points corresponding to tall and thin objects, or to facets of buildings are more important than the key points corresponding to irregular shaped objects, such as a crown of a tree.

Figure 10B:
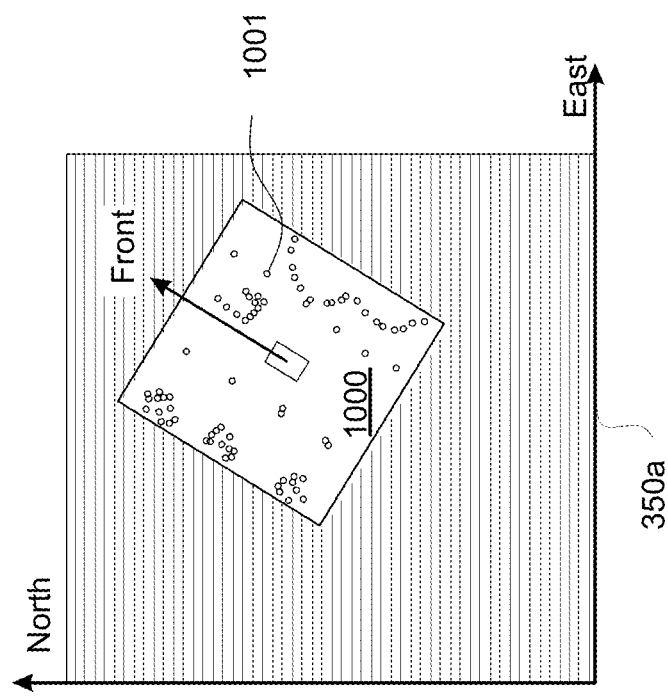
FIG. 10B shows a 2D reference map including the 2D image in FIG. 10A.
Figure 10A:
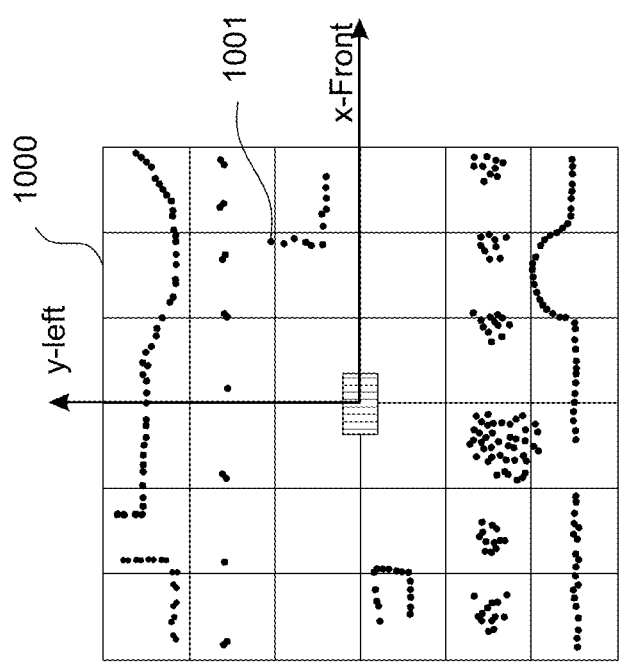
FIG. 10A shows vertical distribution of key points of a 2D image from a coordinate frame fixed to the LIDAR scanning system of the autonomous vehicle.

In some example embodiments, as shown in FIG. 10A, a key point 1001 within a generated 2D image 1000 has the coordinate [$x_k$, $y_k$], where the x-axis is along the direction of travel of the vehicle 100. In some embodiments, the 2D image 1000 has a resolution of 1000×1000 pixels and covers a physical area of 100 m×100 m. The size of each pixel is then 10 cm×10 cm. The LIDAR scanning system 114 is located in the center of the 2D image 1000. Therefore, a key point located at the m row, n column has a coordinate of [$x_k$, $y_k$], where $x_k=(n-499)\times 0.1$, and $y_k=(500-m)\times 0.1$.

Updating Weight Values for Vertical Distribution and Intensity

Referring back to FIG. 4, the update module 320 is configured, through a process 440 further described below in detail, to convert the untwisted 3D point cloud 430 into a 2D image 1000. The untwisted 3D point cloud 430 is equivalent to a tile 610 described above with reference to FIG. 6. The untwisted 3D point cloud 430 is divided into a plurality of cells 620 where each cell a thin column with a square base in 3D space. Each cell 620 may include zero, one, or multiple data points from the untwisted 3D point cloud 430. Each of the plurality of cells 620, through process 440, is represented by at a data set including least a first channel and a second channel. Each cell 620 has a length T along the z-axis of the coordinate system. The length T is defined by an upper boundary and a lower boundary in parallel with a ground of the untwisted 3D point cloud 430, and each 2D image has a position [$x_k^L$, $y_k^L$] and a yaw angle value $\theta^L$, originally obtained based from a GPS system via the satellite receiver 132. For each pixel, the update module 320 is configured to divide the cell 620 along the length T into a plurality of s blocks of equal heights. And for each of the plurality of s blocks, the update module 320 is configured to assign a value of 1 when the block contains at least one data point from the untwisted 3D point cloud 430, and assign a value of 0 when the block does not contain any data point from the untwisted 3D point cloud 430, such that an s-bit binary sequence is generated for each of the plurality of cells 620, and each binary digit in the s-bit is equivalent to the assigned value of a corresponding block in the plurality of s blocks of the cell 620.

The update module 320 is configured to convert the s-bit binary sequence into a corresponding decimal number and save the corresponding decimal number in the first channel included in the data set representing the cell, the first channel representing a vertical distribution value of the cell 620. For each cell 620 in each untwisted 3D point cloud 430, when the cell 620 is determined to be flat in a similar process as described above with reference to generation of vertical distribution values for 2D reference map 350, update module 320 is configured to determine an intensity value based on a maximum intensity value of one or more data points within the cell 620 and save the intensity value in the second channel included in the data set representing the cell 620, and when the cell is determined not to be flat, update module 320 is configured to assign a value of 0 in the second channel of the data set representing the cell 620. The data sets representing the cells are used to generate a 2D image tile corresponding to the untwisted 3D point cloud 430, in which each pixel of the 2D image tile corresponds to a cell 620 of a tile 610 of the 3D point cloud. Each pixel of the 2D image tile includes a first channel indicative of a vertical distribution value of the pixel and a second channel indicative of an intensity value of the pixel. The vertical distribution value of the pixel is obtained from the first channel included the data set representing the cell 620 and the intensity value of the pixel is obtained from the second channel included in the data set representing the cell 620.

Next, the update module 320 is configured to, through a vertical distribution-based key point extraction and weight calculation process 465, determine one or more key points for vertical distribution and use the key points for vertical distribution to calculate one or more vertical distribution weight values 460.

In some embodiments, the vertical distribution-based key point extraction and weight calculation process 465 can be executed by the processor 102, which includes the steps of: sorting from largest to smallest, the plurality of pixels based on the respective value of the respective first channel of each of the plurality of pixels, and choosing among the sorted pixels the first m hundred pixels as key points for vertical distribution for the 2D image, where each key point has a vertical distribution value $v_i^{vert}$, i=1, 2, ..., m, $v_i^{vert}$ equal to the respective value of the respective first channel of the key point.

Next, the update module 320 is configured to, for each key point for vertical distribution in the 2D image, calculate and store an importance gain value for the key point for vertical distribution. The importance gain value adjusts the importance of each key point and is represented by a value $\alpha_{ij}$ defined according to the following equation:

$$\alpha_{ij} = -N_{ij} + N_{max} + k$$

where i denotes a row number of the key point within the 2D image, j denotes a column number of the key point within the 2D image, $N_{max}$ denotes a total number of points in the 2D image that has the highest points in the 2D image, and $N_{min}$ denotes a total number of points in the 2D image that has the least non-zero points in the 2D image, and k is a positive integer.

Note that, there is a trade-off between accuracy and speed. For instance, a 100×100 m 2D image 1000 can be divided into a plurality of blocks of size 10 m×10 m to 20 m×20 m. If there are too many blocks, the algorithm may not be able to achieve real-time performance.

Next, the update module 320 is configured to calculate a vertical distribution weight value 460 for the 2D image based on the importance gain value of at least key point for vertical distribution. The vertical distribution weight value 460 for the 2D image is represented by $w_i^{vert}$ as defined by the equation:

$$w_k^{vert} = \sum_{k=1}^{n} \alpha_k \cdot \mu_k^{vert} \cdot v_k^{vert}$$

where k is an integer from 1 to n, n is a total number m of key points for vertical distribution in the respective 2D image, $v_k^{vert}$ is the vertical distribution value of the key point, $\alpha_k$ is the importance gain value for the key point for vertical distribution, and $\mu_k^{vert}$ is a corresponding vertical distribution value for the key point from the 2D reference map 350, which can be downloaded in real-time based on a current position of the vehicle 100. The computed weight $w_i^{vert}$ 460 may be normalized.

In some embodiments, the update module 320 is configured to, through an intensity-based key point extraction and weight calculation process 455, determine one or more key points for intensity and use the key points for intensity to calculate one or more intensity weight values 450.

In some embodiments, the intensity-based key point extraction and weight calculation process 455 can be executed by the processor 102, which includes the steps of: sorting from largest to smallest, the plurality of pixels based on the respective value of the respective second channel of each of the plurality of pixels, and choosing among the sorted pixels the first l hundred pixels as key points for intensity for the 2D image, where each key point has an intensity value $v_i^{inte}$, i=1, 2, . . . , 1, $v_i^{inte}$ equal to the respective value of the respective second channel of the key point.

The update module 320 is configured to calculate an intensity weight value 450 for the 2D image based on at least one key point for intensity. The intensity weight value 450 is represented by $w_i^{inte}$ as defined by the equation:

$$w_k^{inte} = \sum_{k=1}^{n} \mu_k^{inte} \cdot v_k^{inte}$$

wherein k is an integer from 1 to n, n is a total number l of key points for intensity in the 2D image, $v_k^{inte}$ is the intensity value of the key point, and $\mu_k^{inte}$ is a corresponding intensity value for the key point from the loaded 2D reference map 350a, 350b. The computed weight $w_i^{inte}$ 450 may be normalized.

In order to obtain $\mu_k^{vert}$ or $\mu_k^{inte}$ from the loaded 2D reference map 350a, 350b, which are $v_i^{vert\_map}$ and $v_i^{inte\_map}$, respectively, of each pixel from the load 2D reference map 350a, 350b, a key point transformation is performed by the update module 320. The key point transformation can be done by using the following equation:

$$\begin{bmatrix} x_k \\ y_k \end{bmatrix}_m = \begin{bmatrix} \cos\theta & \sin\theta \\ -\sin\theta & \cos\theta \end{bmatrix} \begin{bmatrix} x_k \\ y_k \end{bmatrix}_L + \begin{bmatrix} x \\ y \end{bmatrix}$$

Where [x, y, θ] is a pose given by a particle associated with the key point, $$\begin{bmatrix} x_k \\ y_k \end{bmatrix}_L$$

are the coordinates for the key point from 2D image 1000 in LIDAR frame, and $$\begin{bmatrix} x_k \\ y_k \end{bmatrix}_m$$

are the coordinates for the key point from the loaded 2D reference map 350a, 350b.

FIG. 10B shows the loaded 2D reference map 350a with the 2D image 1000 of FIG. 10A superimposed on the loaded 2D reference map. Using the key point transformation, the 2D image 1000 has been matched and superimposed (or placed within) the 2D reference map 350a.

Merging Vertical Distribution and Intensity Weight Values with Information Entropy In some embodiments, the vertical distribution weight values and the intensity weight values can be updated by the update module 320 using a particle filtering process 320. In some embodiments, the positioning can be done by using only the vertical distribution weight values or the intensity weight values. In this embodiment, the vertical distribution weight values 460 and the intensity weight values 450 are merged together in a submodule 470 of the update module 320 to increase the robustness of the localization process. The update module 320 is configured to, update, for each key point i in the 2D image 1000, one or both of the vertical distribution weight value $w_i^{vert}$ 460 and the intensity weight value $w_i^{inte}$ 450 based on at least the information entropy value of one or both of the vertical distribution weight value $w_i^{vert}$ 460 and the intensity weight value $w_i^{inte}$ 450.

The information entropy value $H^{vert}$ for the vertical distribution weight value 460 is defined in accordance with the following equation:

$$H^{vert} = 1 + \frac{1}{\log_{10} N} \sum_{i=1}^{N} w_i^{vert} \cdot \log_{10} w_i^{vert},$$

where i is an integer from 1 to N, N is a total number of particles in the particle filter, and $w_i^{vert}$ is the vertical distribution weight value of the $i^{th}$ particle, and $w_i^{vert}$ is the vertical distribution weight value 460 of the key point.

The information entropy value $H^{inte}$ for the intensity weight value 450 is defined in accordance with the following equation:

$$H^{inte} = 1 + \frac{1}{\log_{10} N} \sum_{i=1}^{N} w_i^{inte} \cdot \log_{10} w_i^{inte},$$

i is an integer from 1 to N, N is the total number of particles in the particle filter, and $w_i^{inte}$ is the intensity weight value of the $i^{th}$ particle, and $w_i^{inte}$ is the intensity weight value 460 of the key point.

In some embodiments, the total number of particles N in the particle filter has a pre-determined value. For example, N may be a number between 2000-5000. A particle filtering process with a small N may be fast but likely has inferior robustness, while a particle filtering process with a big N may be slower but with better robustness.

Each particle 442 contains a possible pose [x, y, θ], and N particles leads to N possible poses. The particle filtering update module 320 uses the N poses to transfer the coordinates of key points from 2D image 1000 to 2D reference map 350. If the transferred key points are matching very well with the 2D reference map 350, this possible pose (particle) may receive a high weight value, otherwise, the weight value would be small.

Through a sub-process 482, when one or both of $H^{vert}$ and $H^{inte}$ is less than a given threshold (e.g., very close to zero), the update of one or both of the corresponding vertical distribution weight value $w_i^{vert}$ 460 and the corresponding intensity weight value $w_i^{inte}$ 450 can be skipped and a merged weight $w_i^{merg}$ is used to resample all particles in the particle filter, where the merged weight $w_i^{merg}$ is defined based on the equation:

$$w_i^{merg} = \frac{H^{vert} \cdot w_i^{vert} + H^{inte} \cdot w_i^{inte}}{H^{vert} + H^{inte}}.$$

The resampling module 340 can then be executed with the merged weights. Repeating the predict/update/resample cycle in the particle filter 300, a low frequency 2D pose can be obtained based on averaging the updated weights 480. For example, the weighted average of these particles is the pose estimation [x', y', θ'] 360, which is the output of the particle filter module 300. The output frequency may be the same as the frequency of the LIDAR scanning system 114, usually between 5-20 Hz, such as 10 Hz. This is considered low frequency data.

More specifically, in order to generate the pose estimation [x', y', θ'] 360, the processor 102 is configured to, for each key point in the 2D image, obtain a corresponding map coordinate $[x_k^M, y_k^M]$ (also written as $$\begin{bmatrix} x_k \\ y_k \end{bmatrix}_m$$

above) of the key point from the loaded 2D reference map 350a, 350b based on the position $[x_k^L, y_k^L]$ (also written as $$\begin{bmatrix} x_k \\ y_k \end{bmatrix}_L$$

above) and yaw angle value $\theta^L$ of the key point in the 2D image 1000. The processor 102 is configured to then generate an estimated position [x', y'] of the vehicle based on the corresponding map coordinates $[x_k^M, y_k^M]$ of at least one key point, and one or both of the corresponding vertical distribution weight value 460 and the intensity weight value 450. Similarly, the processor 102 is configured to generate an estimated yaw angle value θ' of the vehicle 105 based on the yaw angle value $\theta^L$ of at least one key point and one or both of the corresponding vertical distribution weight value 460 and the intensity weight value 450.

Figure 11:
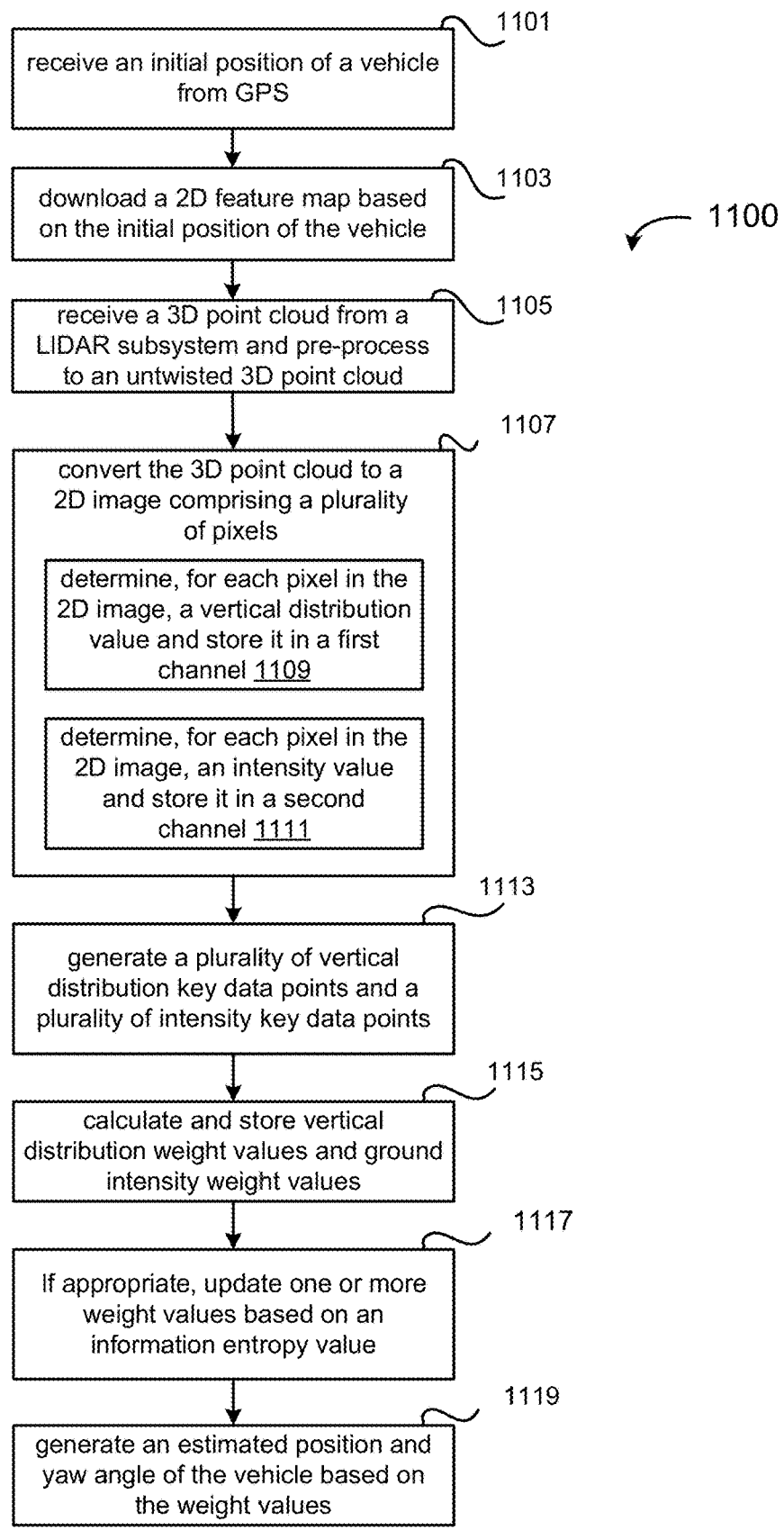
FIG. 11 is a flowchart of a method of determining a 2D position and a yaw angle of an autonomous vehicle in accordance with one example embodiment of the present disclosure.

FIG. 11 is a flowchart of a method 1100 performed a 2D position and a yaw angle of a vehicle in accordance with one example embodiment of the present disclosure. The method 1100 may be carried out by software executed, for example, by the processor 102 of the vehicle control system 115. Coding of software for carrying out such a method 1100 is within the scope of a person of ordinary skill in the art provided the present disclosure. The method 1100 may contain additional or fewer steps than shown and/or described, and may be performed in a different order. Machine readable code executable by the processor 102 to perform the method 1110 may be stored in a non-transitory machine readable medium, such as the memory 126 of the vehicle control system 115.

The method 1100 begins at step 1101. At step 1100, an initial position of the vehicle 105 is received from a GPS unit, the initial position may be represented by map coordinates $[x_{ini}, y_{ini}]$. At step 1103, a 2D reference map 350 is downloaded based on the initial position of the vehicle 100; in some embodiments, one or more image tiles of the 2D reference map may be downloaded based on the position of the vehicle 100, each image tile may be of a certain size, e.g., with a side length of 2 to 5 meters, such as 3 meters. At step 1105, a 3D point cloud 410 from a LIDAR subsystem 114 is received, which can be processed to generate an untwisted 3D point cloud 430. At step 1107, the 3D point cloud (or the untwisted 3D point cloud) 430 is converted to a 2D image comprising a plurality of pixels. Step 1107 may include steps 1109 and 1111, which may be performed concurrently or sequentially. At step 1109, for each cell 620 in the 3D point cloud (or the untwisted 3D point cloud) 430, a vertical distribution value is determined and store in a first channel included in a data set representing the cell 620. At step 1111, for each cell in the 3D point cloud (or the untwisted 3D point cloud) 430, an intensity value is determined and store in a second channel included in the data set representing the cell 620. At step 1113, a plurality of vertical distribution key points and a plurality of intensity key points for the 3D point cloud are generated. At step 1115, vertical distribution weight values and intensity weight values for the data points are calculated and stored in memory 126. At step 1117, if appropriate, one or more weight values based on an information entropy value are updated. At step 1119, an estimated position and yaw angle of the vehicle 105 is generated based on the weight values.

Generating 6DOF Position and Orientation

Figure 5:
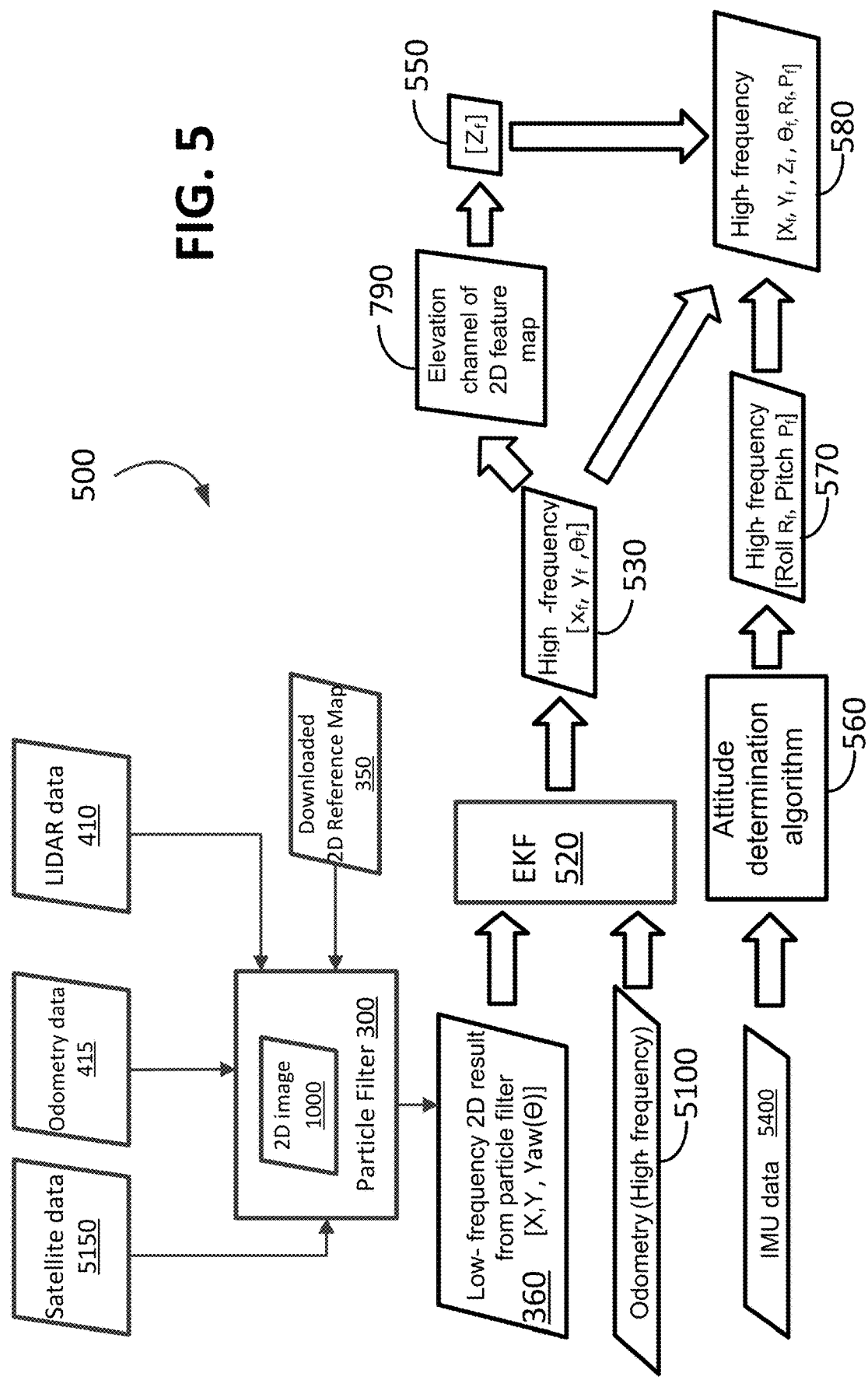
FIG. 5 is a block diagram illustrating a method for localization of an autonomous vehicle in accordance with one example embodiment of the present disclosure.
Figure 12:
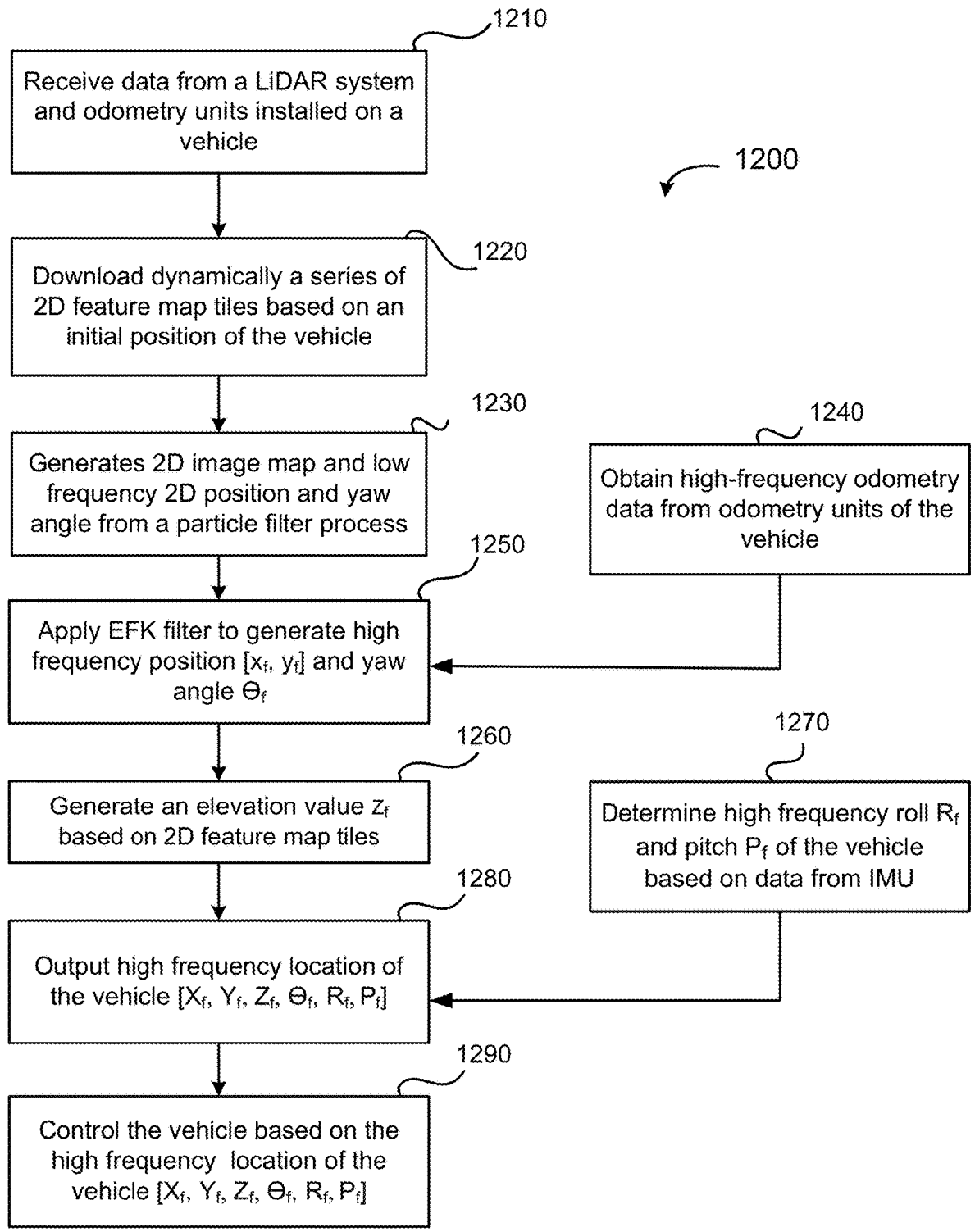
FIG. 12 is a flowchart of a method of determining a 6DOF location of an autonomous vehicle in accordance with one example embodiment of the present disclosure.

FIG. 5 is a block diagram illustrating a method 500 for localization of an autonomous vehicle in real-time in accordance with one example embodiment of the present disclosure. FIG. 12 illustrates a flowchart of a method 1200 for localization of an autonomous vehicle in real-time in accordance with one example embodiment of the present disclosure. The methods 500, 1200 may be carried out by software executed, for example, by the processor 102 of the vehicle control system 115. Coding of software for carrying out such a method 500, 1200 is within the scope of a person of ordinary skill in the art provided the present disclosure. The methods 500, 1200 may contain additional or fewer steps than shown and/or described, and may be performed in a different order. Machine readable code executable by the processor 102 to perform the methods 500, 1200 may be stored in a non-transitory machine readable medium, such as the memory 126 of the vehicle control system 115.

The methods 500, 1200 begin at step 1210. At step 3103D point cloud 410 is received from a LIDAR scanning system 114 of the vehicle 105 and odometry data 415 is received from wheel odometry unit 117 of the vehicle 105. Optionally, further odometry data may be received from the IMU 118 of the vehicle 105. As an optional step, the 3D point cloud 410 may be processed to generate the untwisted 3D point cloud 430. At step 1220, a series of 2D image tiles of a loaded 2D reference map 350a, 350b are downloaded from external storage (as described above) or obtained from memory 126 of the vehicle 100 based on an initial position of the vehicle 100. The initial position of the vehicle 100 is obtained from a GPS signal received from a GPS satellite via satellite receiver 132. The initial position of the vehicle 100 may include a coordinate $[x_{ini}, y_{ini}]$ of the vehicle 100. In some embodiments, the initial position of the vehicle 100 may further include an initial yaw angle value $\theta_{ini}$ of the vehicle 100. At step 1230, a particle filter process 300 is executed to generate a 2D image 1000 from a current 3D point cloud 410 obtained from the LIDAR scanning unit 114, or an untwisted 3D point cloud 430 generated from the current 3D point cloud 410. The 2D image 1000 may be a rectangular or a square shaped with a side length between 20 to 200 meters (e.g. 100 m×100 m). At step 1230, a low frequency (e.g. 5-20 Hz) pose estimation [x', y', θ'] 360 of the vehicle 100 is also output, based on the process described with respect to FIG. 4 above. At step 1240, which can be parallel to steps 1210 to 1230, odometry data 415 from IMU 118 and/or wheel odometry unit 117 of the vehicle 100 is obtained. The odometry data 415 can be obtained at a frequency of 50-200 Hz based on an operating frequency of the IMU 118 or wheel odometry unit 117. At step 1250, the low frequency 2D pose estimation [x', y', θ'] 360 is integrated with the odometry data 415 by an Extended Kalman filter (EKF) 520 to obtain a final pose estimation $[x_f, y_f, \theta_f]$ 530. This final pose estimation is obtained at a frequency value equivalent to that of the IMU unit 118, which can be from 50 to 200 Hz.

At step 1260, an elevation value $Z_f$ 550 is generated by mapping the coordinates $[x_f, y_f, \theta_f]$ 530 with a loaded 2D reference map 350a, 350b and looking up the elevation height value stored in the third (B) channel 790 of a corresponding pixel in the image tiles 820*a*, 820*b*, 820*c* in the loaded 2D reference map 350*a*, 350*b*.

In parallel with steps 1210 to 1260, odometry data 5400 is received from IMU 118 and a final roll $R_f$ and a final pitch $P_f$ 570 of the vehicle 105 is determined based on an attitude determination algorithm 560.

At step 1280, the final 6DOF high frequency pose 580 [$x_f$, $y_f$, $z_f$], roll $R_f$, pitch $P_f$ and yaw angle $\theta_f$ of the vehicle 105 is generated and output to a different unit within the vehicle 100 such as the path planning module 174.

At step 1290, the vehicle 100 may be controlled by the vehicle control system 115 based on the high frequency pose or location 580 [$X_f$, $Y_f$, $Z_f$, $\theta_f$, $R_f$, $P_f$] of the vehicle 100. The processor 102 of the vehicle controller 115 may execute instructions of the autonomous driving module 172 which generates commands or instructions for the drive control system 150 based on the that are output to the drive control system 150. The drive control system 150 controls the steering unit 152, the brake unit 154, and the throttle unit 156 to cause the vehicle 100 to follow a trajectory of the vehicle 100

This disclosure proposes a number of technical solutions to address the problems described in the Background section. For example, the use of an information entropy and merged weight takes advantages of both the vertical distribution information and intensity to deliver a robust localization process. The proposed solution in some embodiments also utilize an information gain matrix to denote the importance of key points based on the geometry structure underlying each key point. With this method, the proposed particle filter algorithm still works when a certain type of land marker is missing.

Different from existing 2D localization methods, the proposed solution can generate a high frequency 3D position and orientation with the computational complexity of a 2D localization algorithm. The absolute elevation $Z_f$ is computed by matching a 2D coordinates with the corresponding elevation height information embedded within in the 2D reference map that has been previously obtained from a region-scale 3D point cloud map.

On a desktop PC with Intel i7 CPU and Linux operating system, the matching frequency can reach 10 Hz, which is an example frequency of a LIDAR scanning system 114 of the vehicle 100.

The 2D reference map introduced in this disclosure has a small size and occupies a small memory space. For example, each 100 m×100 m map tile is approximately 300 KB, which makes it easy to download or transfer multiple of these map tiles in real-time via the cellular data network.

Entropy-based fusion method increases the positioning accuracy and robustness. Road test results show that in the urban environment the position error is less than 20 cm. The attitude error is less than 0.2 degree (RTK-GPS output is used as the ground truth). Moreover, the algorithm works well when intensity cannot be detected.

In some embodiments, different algorithms may be used to map a 2D image 1000 to a 2D reference map 350. For example, Normal Distributions Transform (NDT), Iterative Closest Point (ICP) or the improved NDT or ICP algorithms can be used. However, the map size required in these methods tends to be much bigger than the map size required by the proposed solution described in this invention, and the computational complexity of executing the NDT, ICP algorithms also tends to be higher than required to run the proposed solution described in this invention.

The localization method introduced in this disclosure can also be used on indoor or outdoor mobile robot or UAV.

The features (e.g. key points based on a vertical distribution and intensity) proposed in this disclosure are small in size, while most of the dynamic objects from the 3D point cloud have been removed by eliminating pixels that do not have enough laser points within. This solution can be used in feature lifelong mapping. For example, since the size of the features are relatively small, vehicles can send feature data and localization results back to a central control center through the cellular network. The central control center can use these feature data to detect the change of the environment and update the map accordingly.

The coding of software and software modules for carrying out the above-described methods described is within the scope of a person of ordinary skill in the art having regard to the present disclosure. Executable instructions of software code or and software modules for execution by one or more processors of one or more respective devices to perform the above-described method may be stored in a machine-readable medium as the memory of the vehicle control system. The steps and/or operations in the flowcharts and drawings described herein are for purposes of example only. There may be many variations to these steps and/or operations without departing from the teachings of the present disclosure. For instance, the steps may be performed in a differing order, or steps may be added, deleted, or modified. Although the processor 102 is described as performing many of the operations of the method 1100 or method 1200, one or more dedicated digital signal processors (DSPs), graphical processing units (GPU), or image processors may be used to perform some of the described operations. The particular processing entity that performs the described operations is not intended to be restrictive to the present disclosure.

All values and sub-ranges within disclosed ranges are also disclosed. Also, although the systems, devices and processes disclosed and shown herein may comprise a specific number of elements/components, the systems, devices and assemblies may be modified to include additional or fewer of such elements/components. For example, although any of the elements/components disclosed may be referenced as being singular, the embodiments disclosed herein may be modified to include a plurality of such elements/components. The subject matter described herein intends to cover and embrace all suitable changes in technology.

Although the present disclosure is described, at least in part, in terms of methods, a person of ordinary skill in the art will understand that the present disclosure is also directed to the various components for performing at least some of the aspects and features of the described methods, be it by way of hardware (DSPs, ASIC, or FPGAs), software or a combination thereof. Accordingly, the technical solution of the present disclosure may be embodied in a non-volatile or non-transitory machine readable medium (e.g., optical disk, flash memory, etc.) having stored thereon executable instructions tangibly stored thereon that enable a processing device (e.g., a vehicle control system) to execute examples of the methods disclosed herein.

The present disclosure may be embodied in other specific forms without departing from the subject matter of the claims. The described example embodiments are to be considered in all respects as being only illustrative and not restrictive. The present disclosure intends to cover and embrace all suitable changes in technology. The scope of the present disclosure is, therefore, described by the appended claims rather than by the foregoing description. The scope of the claims should not be limited by the embodiments set forth in the examples, but should be given the broadest interpretation consistent with the description as a whole.

The invention claimed is:

1. A method for localization of an autonomous vehicle, the method performed by a vehicle control system of the autonomous vehicle, the method comprising:
obtaining an initial position of the vehicle from a global positioning unit of the autonomous vehicle;
obtaining a two-dimensional (2D) feature map based on the initial position of the autonomous vehicle, the 2D feature map corresponding to a region-scale three dimensional point cloud for region that includes the environment;
obtaining a three-dimensional (3D) point cloud of an environment surrounding the autonomous vehicle;
obtaining odometry data of the autonomous vehicle;
processing the 3D point cloud to generate a 2D image of the environment;
estimating, using a particle filter process, a pose of the autonomous vehicle based on the 2D image of the environment and the 2D feature map, wherein the estimating includes determining a plurality of key points within the 2D image based on at least one of vertical distribution information or intensity information, wherein determining the plurality of key points within the 2D image comprises:
sorting the pixels of the 2D image based on the value of the first channel of each pixel in the 2D image, and selecting from the sorted pixels the first m pixels as the plurality of key points for vertical distribution for the 2D image, wherein each key point has a vertical distribution value $v_i^{vert}$, i=1, 2, ..., m, $v_i^{vert}$ equal to the respective value of the respective first channel of the key point;
sorting the plurality of pixels based on the respective value of the respective second channel of each of the plurality of pixels, and select from the sorted pixels the first m pixels as the plurality of key points for intensity for the 2D image, wherein each key point has an intensity value $v_i^{vert}$, i=1, 2, ..., 1, $v_i^{vert}$ equal to the respective value of the respective second channel of the key point;
for each key point for vertical distribution in the 2D image, calculating and storing an importance gain value for the key point for vertical distribution;
computing and storing the vertical distribution weight value for the 2D image based on the importance gain value of at least one key point for vertical distribution;
computing and storing the intensity weight value for the 2D image based on at least one key point for intensity; and
updating one or both of the vertical distribution weight value and the intensity weight value based on at least an information entropy value of one or both of the vertical distribution weight value and the intensity weight value; and
generating a location of the autonomous vehicle in the environment comprising a final pose of the vehicle determined based on the estimate of the pose of the autonomous vehicle and the odometry data, an elevation of the autonomous vehicle generated based on the final pose of the autonomous vehicle and the 2D feature map, and an orientation of the autonomous vehicle generated based on the odometry data; and
performing one or more of:
displaying the location of the autonomous vehicle in the environment of a display of the autonomous vehicle; or
determining a trajectory for the autonomous vehicle based on the location, generating instructions based on the trajectory, and executing the instructions to cause the autonomous vehicle to follow the trajectory.

2. The method of claim 1, wherein the estimate of the pose of the autonomous vehicle includes an estimated yaw angle value of the autonomous vehicle, and wherein the final pose of the autonomous vehicle comprises a final yaw angle of the autonomous vehicle generated based on the odometry data and the estimated yaw angle value of the vehicle.

3. The method of claim 1, wherein the orientation of the autonomous vehicle comprises a final roll value and a final pitch value of the autonomous vehicle, and wherein the final roll value and the final pitch value are determined by processing the odometry data using an attitude determination algorithm.

4. The method of claim 1, wherein the final pose of the autonomous vehicle is determined by using an Extended Kalman filter (EKF) to integrate the estimate of the pose of the autonomous vehicle with and the odometry data.

5. The method of claim 1, further comprising:
processing the 3D point cloud of the environment surrounding the autonomous vehicle using the odometry data to generate an untwisted 3D point cloud, wherein the untwisted 3D point cloud is used to generate the 2D image.

6. The method of claim 5, wherein the 3D point cloud comprises a plurality of data points, wherein each data point has an intensity value and a set of coordinates, and wherein the steps of processing the 3D point cloud to generate the 2D image, and estimating, using the particle filter process, the pose of the autonomous vehicle based on the 2D image and the 2D feature map comprise:
dividing the 3D point cloud along a plane into a plurality of titles;
dividing each tile into a plurality of cells, wherein each cell has a length T along a z-axis of a coordinate system, the length T being defined by an upper bound and a lower bound in parallel with a ground surface of the 3D point cloud, and wherein each of the plurality of cells has a 2D position $[x_k^L, y_k^L]$ based on the coordinate system and a yaw angle value $\theta^L$;
for each cell in each tile:
dividing the cell along the length T into a plurality of s blocks of equal heights;
for each of the plurality of s blocks, assigning a value of 1 responsive to the block containing at least one data point from the 3D point cloud, and assigning a value of 0 responsive to the block not containing any data point from the 3D point cloud, such that an s-bit binary sequence is generated for each of the plurality of cells, and each binary digit in the s-bit binary sequence is equivalent to the assigned value of a corresponding block in the plurality of s blocks of the cell;
converting the s-bit binary sequence into a corresponding decimal number and save the corresponding decimal number in the first channel of a data set representing the cell;
responsive to the cell being determined to be flat, determining an intensity value based on a maximum intensity value of one or more data points of the 3D point cloud that are within the cell and saving the intensity value in the second channel of the data set representing the cell;

responsive to the cell being determined to be not flat, assigning a value of 0 in the second channel of the data set representing the cell; and generating the 2D image of the 3D point cloud based on the data set representing each cell for each tile.

7. The method of claim 6, wherein the obtaining the 2D feature map comprises downloading one or more tiles of the 2D feature map based on the initial position of the vehicle.

8. The method of claim 6, wherein each of the one or more tiles of the 2D feature map is a square tile having a side length between 20 to 200 meters.

9. The method of claim 1, wherein for each key point in the 2D image, the importance gain value for the key point for vertical distribution is represented by a value $\alpha_{ij}$ and is determined in accordance with the following equation:

$$\alpha_{ij} = -N_{ij} + N_{max} + k$$

wherein i denotes a row number of the key point within the 2D image, j denotes a column number of the key point within the 2D image, $N_{max}$ denotes a total number of points in the 2D image that has the highest points in the 2D image, and $N_{min}$ denotes a total number of points in the 2D image that has the least non-zero points in the 2D image, and k is a positive integer.

10. The method of claim 9, wherein the vertical distribution weight value is represented by $w_i^{vert}$ and determined by the equation:

$$w_i^{vert} = \sum_{k=1}^{n} \alpha_k \cdot \mu_k^{vert} \cdot v_k^{vert},$$

wherein k is an integer from 1 to n, n is a total number m of key points for vertical distribution in the respective 2D image, $v_k^{vert}$ is the vertical distribution value of the key point, $\alpha_k$ is the importance gain value for the key point for vertical distribution, and $\mu_k^{vert}$ is a corresponding vertical distribution value for the key point from the 2D feature map; and wherein for each key point in the 2D image, the intensity weight value is represented by $w_i^{vert}$ as defined by the equation:

$$w_i^{inte} = \sum_{i=1}^{n} \mu_k^{inte} \cdot v_k^{inte},$$

wherein k is an integer from 1 to n, n is a total number l of key points for intensity in the 2D image, $v_k^{inte}$ is the intensity value of the key point, and $\mu_k^{inte}$ is a corresponding intensity value for the key point from the 2D feature map.

11. The method of claim 10, further comprising estimating the pose of the autonomous vehicle by:

updating, one or both of the vertical distribution weight value $w_i^{vert}$ and the intensity weight value $w_i^{vert}$ based on at least the information entropy value of one or both of the vertical distribution weight value $w_i^{vert}$ and the intensity weight value $w_i^{inte}$;

wherein the information entropy value $H^{vert}$ for the vertical distribution weight value is determined in accordance with the following equation:

$$H^{vert} = 1 + \frac{1}{\log_{10} N} \sum_{i=1}^{N} w_i^{vert} \cdot \log_{10} w_i^{vert},$$

wherein i is an integer from 1 to N, N is a total number of particles in the particle filter, and $w_i^{vert}$ is the vertical distribution weight value of the $i^{th}$ particle;

wherein the information entropy value $H^{inte}$ for the intensity weight value is determined in accordance with the following equation:

$$H^{inte} = 1 + \frac{1}{\log_{10} N} \sum_{i=1}^{N} w_i^{inte} \cdot \log_{10} w_i^{inte},$$

wherein i is an integer from 1 to N, N is the total number of particles in the particle filter, and $w_i^{vert}$ is the intensity weight value of the $i^{th}$ particle; and wherein responsive to one or both of $H^{vert}$ and $H^{inte}$ is less than a given threshold, the update of one or both of the corresponding vertical distribution weight value $w_i^{vert}$ and the corresponding intensity weight value $w_i^{vert}$ is skipped and a merged weight $w_i^{merg}$ is used to resample all particles in the particle filter, and wherein the merged weight $w_i^{merg}$ is defined based on the equation:

$$w_i^{merg} = \frac{H^{vert} \cdot w_i^{vert} + H^{inte} \cdot w_i^{inte}}{H^{vert} + H^{inte}}.$$

12. The method of claim 11, wherein the total number of particles in the particle filter has a pre-determined value.

13. The method of claim 10, wherein the corresponding vertical distribution value for the key point in the 2D image is obtained by locating a corresponding pixel in the 2D feature map based on the map coordinate of the pixel in the 2D feature map.

14. The method of claim 1, further comprising:

determining a maximum elevation $h_{max}$ of a cell and a minimum elevation $h_{min}$ of the cell;

determining that the cell is flat responsive to the difference between $h_{max}$ and $h_{min}$ is less than a given threshold $h_{th}$;

wherein $h_{max}$ is determined based on a height of a data point in the cell that has the highest elevation from ground among all data points in the cell; and wherein $h_{min}$ is determined based on a height of a data point in the cell that has the lowest elevation from ground among all data points in the cell.

15. The method of claim 1, wherein the location of the autonomous vehicle is output at a frequency that is equivalent to a frequency that the further odometry data is obtained by an inertial measurement unit (IMU) of the autonomous vehicle.

16. A system for localization of an autonomous vehicle, the system comprising:

a processor; and a memory coupled to the processor, the memory tangibly storing thereon executable instructions that, responsive to execution by the processor, configure the processor to:

obtain an initial position of the vehicle from a global positioning unit of the autonomous vehicle;

obtain a two dimensional (2D) feature map based on the initial position of the autonomous vehicle, the 2D feature map corresponding to a region-scale three dimensional point cloud for region that includes the environment;

obtain a three-dimensional (3D) point cloud of an environment surrounding the autonomous vehicle;

obtain odometry data of the autonomous vehicle;

process the 3D untwisted point cloud to generate a 2D image of the environment; and estimate, using the particle filter process, the pose of the autonomous vehicle based on the 2D image of the environment and the 2D feature map, wherein the estimating includes determining a plurality of key points within the 2D image based on at least one of vertical distribution information or intensity information, wherein determining the plurality of key points within the 2D image comprises:

sorting the pixels of the 2D image based on the value of the first channel of each pixel in the 2D image, and selecting from the sorted pixels the first m pixels as the plurality of key points for vertical distribution for the 2D image, wherein each key point has a vertical distribution value $v_i^{vert}$, i=1, 2, ..., m, $v_i^{vert}$ equal to the respective value of the respective first channel of the key point;

sorting the plurality of pixels based on the respective value of the respective second channel of each of the plurality of pixels, and select from the sorted pixels the first m pixels as the plurality of key points for intensity for the 2D image, wherein each key point has an intensity value $v_i^{inte}$, i=1, 2, ..., l, $v_k^{inte}$ equal to the respective value of the respective second channel of the key point;

for each key point for vertical distribution in the 2D image, calculating and storing an importance gain value for the key point for vertical distribution;

computing and storing the vertical distribution weight value for the 2D image based on the importance gain value of at least one key point for vertical distribution;

computing and storing the intensity weight value for the 2D image based on at least one key point for intensity; and updating one or both of the vertical distribution weight value and the intensity weight value based on at least an information entropy value of one or both of the vertical distribution weight value and the intensity weight; and generate a location of the autonomous vehicle in the environment comprising a final pose of the vehicle determined based on the estimate of the pose of the autonomous vehicle and the odometry data, an elevation of the autonomous vehicle generated based on the final pose of the autonomous vehicle and the 2D feature map, and an orientation of the autonomous vehicle generated based on the odometry data; and perform one or more of:

displaying the location of the autonomous vehicle in the environment of a display of the autonomous vehicle; or determining a trajectory for the autonomous vehicle based on the location, generating instructions based on the trajectory, and executing the instructions to cause the autonomous vehicle to follow the trajectory.

17. The system of claim 16, wherein the estimate of the pose of the autonomous vehicle includes an estimated yaw angle value of the autonomous vehicle, and wherein the final pose of the autonomous vehicle comprises a final yaw angle of the autonomous vehicle generated based on the odometry data and the estimated yaw angle value of the vehicle.

18. A non-transitory machine-readable medium having tangibly stored thereon executable instructions that, in response to execution by one or more processors, cause the one or more processors to:

obtain an initial position of the vehicle from a global positioning unit of the autonomous vehicle;

obtain a two-dimensional (2D) feature map based on the initial position of the autonomous vehicle, the 2D feature map corresponding to a region-scale three dimensional point cloud for region that includes the environment;

obtain a three-dimensional (3D) point cloud of an environment surrounding the autonomous vehicle;

obtain odometry data of the autonomous vehicle;

process the 3D untwisted point cloud to generate a 2D image of the environment; and estimate, using the particle filter process, the pose of the autonomous vehicle based on the 2D image of the environment and the 2D feature map, wherein the estimating includes determining a plurality of key points within the 2D image based on at least one of vertical distribution information or intensity information, wherein determining the plurality of key points within the 2D image comprises:

sorting the pixels of the 2D image based on the value of the first channel of each pixel in the 2D image, and selecting from the sorted pixels the first m pixels as the plurality of key points for vertical distribution for the 2D image, wherein each key point has a vertical distribution value $v_i^{vert}$, i=1, 2, ..., m, $v_i^{vert}$ equal to the respective value of the respective first channel of the key point;

sorting the plurality of pixels based on the respective value of the respective second channel of each of the plurality of pixels, and select from the sorted pixels the first m pixels as the plurality of key points for intensity for the 2D image, wherein each key point has an intensity value $v_i^{inte}$, i=1, 2, ..., l, $v_k^{inte}$ equal to the respective value of the respective second channel of the key point;

for each key point for vertical distribution in the 2D image, calculating and storing an importance gain value for the key point for vertical distribution;

computing and storing the vertical distribution weight value for the 2D image based on the importance gain value of at least one key point for vertical distribution;

computing and storing the intensity weight value for the 2D image based on at least one key point for intensity; and updating one or both of the vertical distribution weight value and the intensity weight value based on at least an information entropy value of one or both of the vertical distribution weight value and the intensity weight; and generate a location of the autonomous vehicle in the environment comprising a final pose of the vehicle determined based on the estimate of the pose of the autonomous vehicle and the odometry data, an elevation of the autonomous vehicle generated based on the final pose of the autonomous vehicle and the 2D feature map, and an orientation of the autonomous vehicle generated based on the odometry data; and perform one or more of:
- displaying the location of the autonomous vehicle in the environment of a display of the autonomous vehicle; or
- determining a trajectory for the autonomous vehicle based on the location, generating instructions based on the trajectory, and executing the instructions to cause the autonomous vehicle to follow the trajectory.

19. The non-transitory computer-readable medium of claim 18, wherein the estimate of the pose of the autonomous vehicle includes an estimated yaw angle value of the autonomous vehicle, and wherein the final pose of the autonomous vehicle comprises a final yaw angle of the autonomous vehicle generated based on the odometry data and the estimated yaw angle value of the vehicle.

* * * * *